(12) United States Patent
Matichuk

(10) Patent No.: US 7,454,399 B2
(45) Date of Patent: Nov. 18, 2008

(54) APPLICATION INTEGRATION SYSTEM AND METHOD USING INTELLIGENT AGENTS FOR INTEGRATING INFORMATION ACCESS OVER EXTENDED NETWORKS

(75) Inventor: Bruce Matichuk, Edmonton (CA)

(73) Assignee: Celcorp, Inc., Alberta (CA)

( * ) Notice: Subject to any disclaimer, the term of this patent is extended or adjusted under 35 U.S.C. 154(b) by 597 days.

(21) Appl. No.: 10/851,639

(22) Filed: May 24, 2004

(65) Prior Publication Data

US 2005/0027495 A1 Feb. 3, 2005

Related U.S. Application Data

(63) Continuation-in-part of application No. 09/801,795, filed on Mar. 9, 2001, now Pat. No. 7,269,580.

(60) Provisional application No. 60/472,409, filed on May 22, 2003, provisional application No. 60/237,276, filed on Oct. 3, 2000.

(51) Int. Cl.
*G06F 17/00* (2006.01)
*G06N 7/00* (2006.01)
*G06N 7/08* (2006.01)

(52) U.S. Cl. .............................. 706/53; 706/46; 706/14

(58) Field of Classification Search .................. 703/53, 703/46, 14; 700/49
See application file for complete search history.

(56) References Cited

U.S. PATENT DOCUMENTS

| | | | | |
|---|---|---|---|---|
| 5,581,663 A * | 12/1996 | Zlotin et al. | ................... | 706/46 |
| 5,963,447 A * | 10/1999 | Kohn et al. | ................... | 700/49 |
| 6,044,222 A * | 3/2000 | Simons et al. | .............. | 717/156 |
| 6,256,038 B1 * | 7/2001 | Krishnamurthy | ............ | 345/419 |
| 6,256,734 B1 * | 7/2001 | Blaze et al. | .................. | 713/157 |
| 6,505,085 B1 * | 1/2003 | Tuttle et al. | ................... | 700/28 |
| 6,629,139 B1 * | 9/2003 | Kennedy | .................... | 709/224 |
| 6,658,234 B1 * | 12/2003 | Dogan et al. | ............... | 455/63.1 |
| 6,697,633 B1 * | 2/2004 | Dogan et al. | ................ | 455/509 |

\* cited by examiner

*Primary Examiner*—Joseph P Hirl
(74) *Attorney, Agent, or Firm*—Harrington & Smith, PC

(57) ABSTRACT

Models that encapsulate information on how remote applications are controlled and data is accessed are created to be used by a runtime agent that intelligently reasons out goal-oriented plans and execute tasks to solve problem statements generated by a user interface or other software agents. The models may be used to assemble workflows using a reasoning process. In particular, the models of the present invention include a state that includes a planning state and a navigational value. In embodiments of the invention, the models may include intelligent agents, a loop state, submodel invocation that allows the models to invoke agents over a network, and the ability to integrate the three application layers in a computer.

22 Claims, 6 Drawing Sheets

APPLICATION INTEGRATION SYSTEM AND METHOD USING INTELLIGENT AGENTS FOR INTEGRATING INFORMATION ACCESS OVER EXTENDED NETWORKS

CROSS-REFERENCE TO RELATED APPLICATIONS

The present invention claims priority from U.S. Provisional Application No. 60/472,409 filed on May 22, 2003, the subject matter of which is hereby incorporated by reference in full. The present invention is also a Continuation-In-Part to U.S. application. Ser. No. 09/801,795, filed on Mar. 9, 2001 now U.S. Pat. No. 7,269,580 (which claimed priority to Provisional Patent Application No. 60/237,276 filed Oct. 3, 2000), the subject matter of which is also incorporated by reference in full.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

Many large corporations rely on a wide variety of different and often disparate computer systems that were implemented at various times and circumstances. The multiplicity of systems adds dramatically to a company's costs. Multiplicity also reduces efficiency and a company's operational economies of scale. Also, employees require extensive training in order to be able to use each of the different systems. The cost and inconvenience of upgrading all of these components into one easy to use computer system is also enormous.

Even if a company does manage to upgrade and merge all of its operations into a single computer system, when it wants to collaborate, merge, participate in joint ventures, at least some of the above-noted problems will arise. But, many companies do not upgrade applications because of the expense involved. Thus, there are many systems still in operation that require integration, but are very difficult to integrate, such as, systems that are only terminal-accessible.

Terminal-accessible systems, such as, one that requires access via a 3270 terminal, were the predominant applications architecture prior to the proliferation of personal computers ("PC"). Unlike PCs, such terminals were not capable of running software independently of a mainframe. While use of PCs has become widespread, there are still terminals in operation, as well as many terminal-accessible systems. In many places, PCs running software called 3270 emulation connect remotely to a computer running 3270 applications. This allows a PC to connect to a terminal-accessible system through an interface that functions like a terminal.

SQL (Structured Query Language) is a standard programming language adopted by the American National Standards Institute and the International Organization for Standardization for getting information from and updating a database. Many databases, such as, Access databases, support SQL queries.

As a result of the continued use of old systems, companies have begun integrating and automating computer systems. Integration, however is not an easy task to accomplish. To integrate many different systems into one user-friendly graphical user interface ("GUI"), a program must in some way control another program or access its data directly. So, for example, while arranging a purchase, a salesman may need to: (1) access a Legacy database to verify that a product is in stock and update inventory, (2) access a separate database to update the customer's information and (3) access a separate website and affiliated database to arrange for shipping. Accessing each of these systems is both time consuming and redundant. The salesman would have to enter the product and customer information three different times each time he/she placed an order. In addition, the salesman would have to be familiar with how to navigate each of these systems.

By integrating all of these systems into one GUI, the salesman would only have to learn one system. Moreover, that employee could be trained quicker, and would not have to re-enter the same information more than once. The difficulty would arise in designing a GUI that can navigate all three of the above-exemplified systems. As previously noted, an interface would have to be designed for each system. While one standard interface could be used for the shipping website, such as a FedEx or UPS website, each Legacy and Access database is designed specifically for the company using it. Each company has unique information that it stores in its databases about products and customers. Accordingly, for each company the arduous task of designing software to interface with its various databases must be undertaken.

There are three distinct techniques for one computer application to talk to another computer application--through the data layer, business logic layer or presentation layer. System A's business logic layer 52 must communicate with system B's data layer 58, business logic layer 57 or presentation layer 56 to access system B 55. Access through the data layer 58 allows direct modification of the data in system B's 55 database. Unfortunately, it is extremely time consuming, expensive and error-prone to interface directly with a system's data layer. As a result, many systems do not allow any direct manipulation or access to the data.

The second method for one system to communicate with a second system is though the second system's business logic layer. For system A 50 to access system B 55 through system B's business logic layer, a transaction interface needs to be developed for system B 55. As is the problem with accessing another system through the data layer, developing a transaction interface to access a system though its business logic layer is time consuming and expensive.

The third method for one system to communicate with a second system is through the second system's presentation layer. While not nearly as expensive as creating a transaction interface to access the business logic layer or accessing the data directly, interfacing with the presentation layer has problems. A particular problem is that the integrating application must wait an appropriate length of time after entering commands to insure that the program has moved to a new state after the commands were entered. However, the time that a state change takes is erratic, so this is problematic.

Another problem is the unpredictable nature of applications in general. When an application does not go to the expected state after a command is entered, a scripted agent is unable to recover without specific instructions being written to cover that situation. This is difficult because there is a near infinite number of ways that an application can behave.

One solution to the state change problem is to program the integrating application to determine which screen it is on. If the application being controlled used screens with unique identifiers, then screen identification information is accessible. If a screen has a unique identifier, the integrating application merely has to look at the unique identifier to know what screen it is on. Only about 20% or less of Legacy systems have applications that use screens with unique identifiers, so it is not an overall solution.

Another solution to the screen recognition issue is for the programmer to select regions of the screen for the software to examine in order to determine which screen is active. However, when a host system or application has numerous different screens it can be a time consuming and error-prone task for a programmer to determine which regions will work efficiently or work at all.

A programmer also has to determine how each screen is reached and from which screens it can be reached. This requires mapping the host application. To map the host application, a list of screens is created in the order they appear during navigation. Each entry in the list includes screen identification information. Necessary information (by using, for example, key words) include: (i) the action that takes place on that screen, (ii) attention identifier keys used on that screen, (iii) the next screen to be displayed, and (iv) the time it takes to navigate from one screen to the next screen.

The next step is to create an itemized description for each screen. This description includes the type of field (read-only, button, etc.), the possible values this field could hold and the appropriate response for each possible value, whether the field can be written to, what can be written to it, the location on the screen of the field, and the length of the field for each field in each screen.

Once this information is compiled, a directed graph or state diagram is created to illustrate the operation of the system. From the directed graph or state diagram, the code to interface with a system can be written. This must be repeated for each system that is to be integrated.

As can be seen from above, even under the best circumstances, the task of integrating disparate databases and computer software is complex, time consuming and expensive. Therefore, there exists a need in the art for software to simplify the process of modeling various systems and seamlessly integrating information access over extended networks.

Artificial Intelligence (AI) Planning and Scheduling is a subject area within the field of Artificial Intelligence that deals with the problem of reasoning about activities and then sequencing them. Action sequences constitute plans that, if executed, represent a means of achieving a specific goal. Planning algorithms do not address the problem of performing these actions; the integration of planning and acting is the focus of "Intelligent Agent" research. The focus of planning research is on the representation of actions, storage and retrieval of actions, time conflict, resources, priorities, action reasoning, time and space complexity, proving correctness, proving solvability (within a reasonable amount of time), knowledge representation, problem complexity and scale, empirical studies demonstrating run-time behavior, real-world applications, uncertainty, model coverage and plan domain learning. Scheduling is a sub-field of planning that deals specifically with planning resource allocations over time to achieve specific goals within minimal time frames and with minimal resource allocation. A brief overview of AI Planning and Scheduling (hereinafter simply referred to as "Planning") is discussed below, including a short history, a description of plan representation, planning algorithms and a look at the future of planning.

Planning has not become a mainstream development technique for a variety of reasons. Until recently, planning was CPU and space inefficient. Planning uses a declarative representation of program behavior, which is not taught in standard programming classes. There are no commercially successful planning tools, and, in the past, planners had a very narrow range of application. Recent developments in planning algorithms and in CPU and space availability have prompted interest in planning architectures. Planners have successfully been applied to a wide range of problems. Further, recent developments, such as planning based method of handling Presentation Layer Automation, represents a shift towards commercial acceptance of planning and paves the way for use within mainstream software development.

There are two distinct types of planning systems: Propositional and Decision Theoretic. Propositional planning deals with the world in terms of actions that are composed of propositional statements about action pre-condition and effects. Decision Theory combines Probability Theory with Utility Theory, and treats the world as a set of states over which an action policy determines likely transitions between states. Decision Theoretic planning involves the calculations of probabilities, and does not provide mechanisms for demand-time goal directed behavior. Rather, Decision Theoretic systems attempt to pre-compute the likelihood that some action in response to some observation will lead to a situation that will ultimately allow a goal to be achieved. Consider the decision to buy a car. There are many tests that could be performed and many issues that need to be considered. Ultimately the decision to move forward should be based on a rational assessment of a reasonable set of tests. While Propositional Planning determines a path to a goal by chaining together logical propositions about how the world behaves, Decision Theoretic planning determines a path to a goal by calculating probabilities of expected outcomes and choosing the most likely course of action. There have been some attempts to merge these two fields, but generally they represent two completely distinct areas.

AI planning is closely related to state-space search, problem reduction and means-end analysis used in problem solving, and to other areas of AI such as theorem proving and situation calculus. The first major planning system was called STRIPS (Stanford Research Institute "SRI" Planning and Scheduling), and was the planning component of the Shakey robot project at SRI. A series of planners have emerged since then, solving many of the major problems of AI planning. One of the early problems discovered in planners was that of interleaving. Non-interleaved plans cannot find goals where sub-goals must be protected halfway through a plan.

Task networks allowed plans to be partially ordered, i.e. not all sequences of actions need to be ordered in a valid plan. More recently, several advances in AI planning have made planners more commercially viable. Early planners suffered from memory use and run-time problems. Newer algorithms guarantee a solution (if one exists) within polynomial time and space (defined below in the Glossary). A disjunctive planner retains the current plan-set without splitting its components into different search branches. Other known planner employed this idea to generate constraints, which are solved using a constraint solver. More recently, TLPlan is the one of the most successful planners in terms of memory efficiency and speed, and is leading the way with a slightly different approach to planning. TLPlan employs heuristic search, which has been found to work well in the area of problem solving. Other planners also use heuristic search. Heuristic search techniques have been shown to be quite fast, and are the basis for many interesting problem solvers such as game systems (some of the groundbreaking discoveries in heuristic search were made at the University of Alberta by Tony Marsland and Jonathan Schaefer). At one time, it was thought that heuristic search could not be applied to planning due the branching factor in planning problems, and the large amount of backtracking that would be required. Recent advances, however, in both heuristic search and in planning have lead to breakthroughs, which are revolutionizing planning systems.

Graphplan is one algorithm that has been very successful in the planning community. When Graphplan arrived in 1995, it generated a lot of interest because of its ability to solve plans for any order of magnitude that was faster than previous algorithms. Since Graphplan was introduced, several other algorithms have been developed that are equally competitive. The basic idea behind Graphplan planning is simple and easily understood in terms of requirements and deliverables. A plan can be thought of as a sequence of activities, where early activities are performed, generating results that, in turn, feed into later activities as deliverables. The overall planning process is prompted by the desire of some agent to achieve some goal. Along with a goal and a knowledge base representing all the actions that can be performed, the planning process requires knowledge about the state of the world at the time of planning, i.e. the initial state.

Consider a plan for going out to the movies. The first activity is to choose a movie, the next is to drive to the theatre complex, then purchase a ticket, optionally purchase some snacks, go into the theatre, and finally watch the movie. Doing these activities out of sequence does not make any sense. The results of each step in the process, and their requirements, impose a logical ordering of the activities. Choosing a movie is important as a first step because the result is a requirement for driving. Driving is important because the result is arriving at some desired location. Purchasing a ticket is a pre-requisite for getting into the theatre. Going into the theatre is a pre-requisite for actually viewing the movie. A planner is able to take all of the possible actions that apply to the problem, and is able to arrange them according to how the preconditions (requirements) mesh with the effects (deliverables) of each action. Although the task seems simple, there are many nuances to the problem that make planning an interesting research topic).

The term classical planning is often used to describe simple worlds with initial states, goal states and a set of deterministic actions. Although the general planning problem is much more complicated, classical planning is an important conceptual step to understanding general planning. Consider the problem of transporting two packets from earth to the moon using a single rocket. This Rocket problem is an example of a propositional planning problem. The problem comprises three classic planning operations: Load, Unload, and Fly. There are two objects, A and B, and three locations, Earth, Moon and Rocket. The Load operation applied to a particular container has a pre-condition that the container is not loaded. The effect of the Load operation is that the container becomes "Loaded." The following notations are used in the discussion of this problem:

"A" refers to Package A and Load A means Load Package A.

"B" refers to Package B and Load B means Load Package B.

"R" refers to the rocket.

State (Proposition): Full description of the entities and the properties of the world at a particular time Action: Progressive alteration of states that result in an observable effect on the external world Initial Conditions: Initial state of the world Goals: Desired property of the world state Plan: Detailed and systematic formulation of actions In planning language of PDDL, the rocket problem would be defined in the following way:

```
(define (domain rocket)
    (:predicates (at ?r - rocket ?from - place)
        (in ?c- cargo ?r - rocket))
    (:action move
        :parameters ( ?r - rocket ?from ?to - place)
        :precondition (and (at ?r ?from))
        :effect (and (at ?r ?to) (not (at ?r ?from))))
    (:action unload
        :parameters (?r - rocket ?p - place ?c - cargo)
        :precondition (and (at ?r ?p) (in ?c ?r))
        :effect (and (not (in ?c ?r)) (at ?c ?p)))
    (:action load
        :parameters (?r - rocket ?p - place ?c - cargo)
        :precondition (and (at ?r ?p) (at ?c ?p) )
        :effect (and (not (at ?c ?p)) (in ?c ?r) ))
```

The following syntax is used to make a request of the planner to find a plan:

```
(define (problem rocketProblem)
    (:domain rocket)
    (:objects A B - cargo
        E M - places
        R - rocket)
    (:init (at A E) (at B E) (at R E))
    (:goal (and (at A M) (at B M) )
```

The Graphplan algorithm requires the following:
A STRIPS-like domain (a set of operators such as Load, Unload, Move)
   Each operator has a set of pre-conditions
      A rule that must be true prior to the use of the operator
   Each operator has a set of effects
      A rule that must be true after the use of the operator
A set of objects (such as Rocket or Package A)
A set of predicates that can be assessed regarding the state of an object (such as In or At)
   Also known as propositions or facts
A set of propositions called the Initial Conditions
   Package A on Earth, Package B on Earth, Rocket on Earth
A set of Problem Goals which are propositions that are required to be true at the end of a plan
   Package A on the Moon, Package B on the Moon In STRIPS, each effect will either "Add" or "Delete" a proposition from the knowledge base. The effect of "Add" is to make the proposition true. The effect of "Delete" is to make the proposition false.

A planning graph consists of a set of levels. The first level is a set of propositions that correspond to the initial conditions. The second level is a set of actions (applied operators) that can be performed given the previous level of propositions. The subsequent level is a set of propositions that would be true if the previous level actions were to be applied.

The Graphplan algorithm begins by taking the known propositions in level 0 and attempts to apply all possible actions with preconditions that match those available. For every proposition, a No-Operation action is also applied. This results in a set of propositions at the next level, called level 1. The subsequent levels repeat this process until a set of propositions are found that match the goal state, or until no new actions may be applied in a given level. At each level, the number of applicable actions or propositions is restricted by the concept of mutual exclusion (mutex).

Thus, two facts $f_1, f_2 \in N_f (n \geq 1)$ are mutually exclusive if no valid plan could possibly make both true. There is no non-exclusive pair of actions o1, o2 ∈ No(n−1)• and no single action o ∈ No(n−1) that adds f1 and f2.

A mutex action pair occurs under three conditions: Inconsistent Effects, Interference and Competing Needs:

Inconsistent Effects occur when the effect of one action is the negation of another action's effects;

Interference occurs if either action deletes a precondition the other; and

Competing Needs occurs if any preconditions for a pair of actions are marked as mutex. A pair of propositions is marked as mutex if all ways of creating one proposition are exclusive of creating the other, or of one is the negation of the other.

In this context, two actions o1 and o2 have "Inconsistent Effects" if the effect of one action is the negation of another. Two actions o1 and o2 "Interfere" if either of the actions deletes a precondition of the other. Two actions o1 and o2 at an action level No (n ≧1) have Competing Needs if there is a precondition of action o1 and a precondition of action b that are marked as mutually exclusive.

An example of mutex actions in the rocket domain includes "Load A" and "Fly to the Moon". Clearly, one cannot fly to the moon at the same time that one is loading the rocket. "Fly to the Moon" deletes the precondition of "Load A", which is that A must be in the same location as the rocket. The propositions that "Rocket on the Moon" and "Rocket on the Earth" are clearly mutually exclusive and cannot exist at the same time frame in a plan.

Once a planning graph is constructed, a backward chaining algorithm is used to determine the best possible path backwards through the graph. In the landmark paper titled "Fast Planning Through Planning Graph Analysis", Blum and Furst were able to prove that Graphplan will find a plan if one exists in polynomial time, or will detect that no solution exists within polynomial time. This was a very important result in the planning community because it validated the applicability of planning for a variety of real-world situations.

The operation of the Graphplan Algorithm is now summarized:

---

Graphplan Algorithm
    Add initial conditions
    Find out which ones are mutex
    Repeat until done:
        Check to see which actions can apply (no mutex preconditions)
            If no actions can be applied then a plan cannot be found
            Add all actions that apply (no mutex preconditions) given current conditions
        Find out which actions are mutex
        Discover new conditions given application of all possible actions
        Find out which conditions are mutex
        If current conditions meet goal conditions then
            Check to see if a plan can be found by backchaining to initial conditions
            Mutex actions cannot occur in the same time frame of a plan
            If a plan can be found then graphplan is done
    End repeat
End Graphplan

---

Overall, automatic workflow generation is closely related to AI planning: it can be treated as a special planning problem and solved by appropriate planner systems. Work has been done on automatic web service synthesis based on AI planning. Though most approaches map web service synthesis into AI planning, the web service domain has its own special characteristics and current AI planning is unlikely to provide a complete solution. First, a web service (task) often has multiple outcomes and nondeterministic behavior. Second, work-low languages provide a set of control constructs, and the synthesis algorithm needs to choose the constructs wisely in order to produce a well structured workflow. Classic planning focuses on generating a path for conjunctive goals and does not consider actions with conditional or nondeterministic effects. Recently, planning algorithms have been developed to handle more complex situations, such as conditions and nondeterminism. However, they are not intended to generate structured workflows.

BRIEF SUMMARY OF THE INVENTION

The present invention simplifies the process of writing software to integrate a variety of systems. According to the present invention, models are created for terminal-accessible systems, SQL databases, and web pages. Runtime agents then use the models to intelligently navigate each system. Such agents can be used to implement systems with a single user interface.

It is, therefore, an object of this invention to provide a simplified method of modeling terminal-accessible systems, SQL databases and web pages to create intelligent agents to navigate those systems.

It is a further object of this invention to provide a computer system state recorder comprising a processor, a computer memory and a user interface stored in the computer memory including a state recorder. The state recorder records in the computer memory a planned domain file which comprises each state of the presentation layer of another computer system, the available actions from each state, and the effect of any actions available in each state through navigating the other computer system in the user interface.

It is another object of this invention to provide a processor which generates the file while a user navigates the other computer system in the user interface.

It is further an object of this invention that the processor generates the file automatically while navigating another computer system.

It yet another object of this invention that pre-conditions and post-conditions are included in the file.

It is further an object of this invention to provide a computer system screen fingerprinter comprising a processor, a computer memory and a user interface that includes a screen fingerprinter where the fingerprinter captures sections of each screen of the presentation space from a computer system and stores the captured screen sections in the computer memory so that the captured section of each screen is unique.

It is further an object of this invention that the intelligent agent generates an optimized path to a desired end state of the other computer systems based on user inputs in the intelligent agent's user interface each time the intelligent agent is run. The intelligent agent executes the optimized path by accessing each other computer system as necessary, retrieving output from the other computer systems and displaying the output in the intelligent agent's user interface.

It is further an object of this invention to provide a computer system for automatically generating constraint models from process models comprising a processor, a computer memory and at least one process model stored in the computer memory wherein the processor converts the process models into a single constraint model and stores the constraint model in the computer memory.

It is further an object of this invention that the processor converts the constraint model into a single process model and stores the process model in the computer memory.

Briefly described, these and objects of the invention are found in a computer system navigation planner comprising a processor, a computer memory, and a user interface. A fingerprinter in the computer memory captures sections of each screen of the presentation space from at least one other computer system. The captured screen is stored in the computer memory in files for each other computer system so that the captured section of each screen in each of said files is unique. The system includes a recorder to record in at least one file for each other computer system each state of the presentation layer of each other computer system. In addition, the recorder stores those keystrokes that are needed to reach each state, how to recognize each screen in the presentation layer, the available actions from each state and the effect of any actions available in each state through navigating the other computer systems in the user interface. The recorder generates a model that can be used by an intelligent agent and such model can be embedded in an intelligent agent. As a result, the processor generates an intelligent agent that includes a user interface.

The present invention enables a user to intelligently plan and execute business processes, transactions, and tasks-based on the present invention models. The present invention models encapsulate information on how remote applications and data are accessed and controlled. With the present invention, the present invention model developer gathers specialist knowledge and builds the present invention models that represent this knowledge. The knowledge is stored in the present invention model and will consist of both process knowledge as well as action specific knowledge. The present invention agents will use this repository of knowledge to manipulate host systems/enterprise applications by querying the model to build navigation plans and then to use the action specific knowledge to manipulate the server/host system. The present invention defines actions/events/methods, connects these together and executes them in order to achieve a goal or target state. Aside from achievement of the goal, managers benefit from information on how and when the host system is interacted with, and information on the result of interaction with the currently executing model.

The following is a sample of some of the kinds of tasks/instructions/host interactions that the present invention can perform. With terminal systems, instructions can be set up in the present invention model to:

1. 'navigate' to a specified terminal-accessible system/application screen state. The present invention can execute a number of actions in a terminal interface to perform tasks such as filling out forms or navigating to a particular screen.
2. read data from or write data to terminal application screens. The present invention uses 'data objects' to define areas of terminal screens that can be read or written to using the present invention instructions.
3. read data from or write data to a variable-length table on terminal application screens. The present uses "list-maps" to define an interface to variable-length tables within terminal applications, and to facilitate reading from or writing to the data in the table.

With SQL systems, the present invention can read data from or write data to an SQL database. The present invention can execute instructions that connect to a database and that execute SQL queries. For web systems, the present invention can read from an HTML page. The present invention can send dynamically generated HTTP requests, and intelligently extract data from Web pages that change in layout or content over time.

In other embodiments, the present invention is capable of host/enterprise system automation via the present invention connectors and the present invention instructions associated with those connectors. The present invention is capable of integrating the data from multiple host/enterprise systems via the present invention's state management and data management facilities. The present invention solutions are able to behave intelligently based upon the knowledge built into the present invention models, and the capacity of the present invention agent to use this knowledge to achieve a defined goal/target state.

The present invention agent intelligence is based upon the agent's ability to query knowledge related to a given goal/target state, perform specific steps required to reach the goal/target state, and recognition of target achievability with each step it takes.

A significant part of the agent's intelligence is the ability to respond when the target is not reachable with the current strategy/plan. In this case, the Agent is able to determine if another course of action/strategy is available and then continue pursuing a new course of action. In the following graphic, the nature of interaction with the present invention agent is demonstrated. A client application would submit a request to the present invention server to accomplish some goal/target state. The agent would process the request, and hold the result for further navigation requests or queries for result information.

In preferred implementation, the present invention solutions exist as a system of interacting components. When a client application initiates the present invention agent request, the agent will proceed to orchestrate the components required to achieve the goal/target start requested. Listed below are some of the higher-level components of the present invention solution. The external systems, alluded to by the connector components, which are also an integral part of the present invention solution, are not listed. As a rule, the first component activated is the present invention agent itself, which then proceeds to load the present invention model (the knowledge repository). Upon querying the present invention model, the agent determines the course of action necessary to achieve the given goal. Then, as the agent makes steps to achieve the goal/target state, components are made available as required by the agent's executing models.

In another embodiment, the present invention provides a planning tool that assembles workflows using an automated reasoning process. In particular, several planning objects are created, each having a defined state conditions which are used to automatically link the different objects based upon state assignments. The state conditions for the objects can be updated dynamically to adjust for previous actions or changes in circumstances. The states represent a series of Boolean expressions that represent required precursor for actions associated with each object as well as results from these actions. In this way, the states are used in both planning and navigation of planning a workflow. Possible states include and error, exception, and user defined. A loop-type allows the repetition of action(s) as long as specified in the state definition. Another type of state, a pattern type, functions in screen navigation, and invokes particular actions at run time by evaluating a pattern on a navigation screen.

The workflow is created in accordance with the discrete series of Boolean expressions contained in the states. Furthermore, each state contains a predefined pre and post conditions, which may be used to assemble the workflow. An initial and desired end conditions are defined as well. Specifically, the workflow is created using a iterative process in which, starting with initial conditions, determining which object can be next performed, and then modifying a current state express to account for the performance of any object. This process is repeated until the desired end result is achieved. The different possible paths for achieve the end result are noted and the compared, and form the possible universe of paths.

In one embodiment, the objects may be used to define composite services which are loosely coupled, in contrast to traditional objects that invoke local actions. In this way, multiple actions on multiple computers may be accessed and employed to generate AI planning through the defining of a composite service that is composed of several services. This allows for the greater planning power as actions may be grouped if possible.

In another embodiment, submodel invocation is used to invoke another processes. In this way, the present invention may be used to wrap the plan domain such that the plan is abostract. In particular, an agent may invoke one or more agents that share a portion of its knowledge base. In this way, tasks can be apportioned opaquely as needed. One plan cannot control the whole knowledge base. Information is restructured so each agent only accesses information as needed perform particular activities. Information can be restricted to external agents that other agents can incorporate and invoke as needed Other objects and advantages of the present invention will be readily apparent from the following description and drawings which illustrate the present invention.

DETAILED DESCRIPTION OF THE INVENTION

Figure 1:
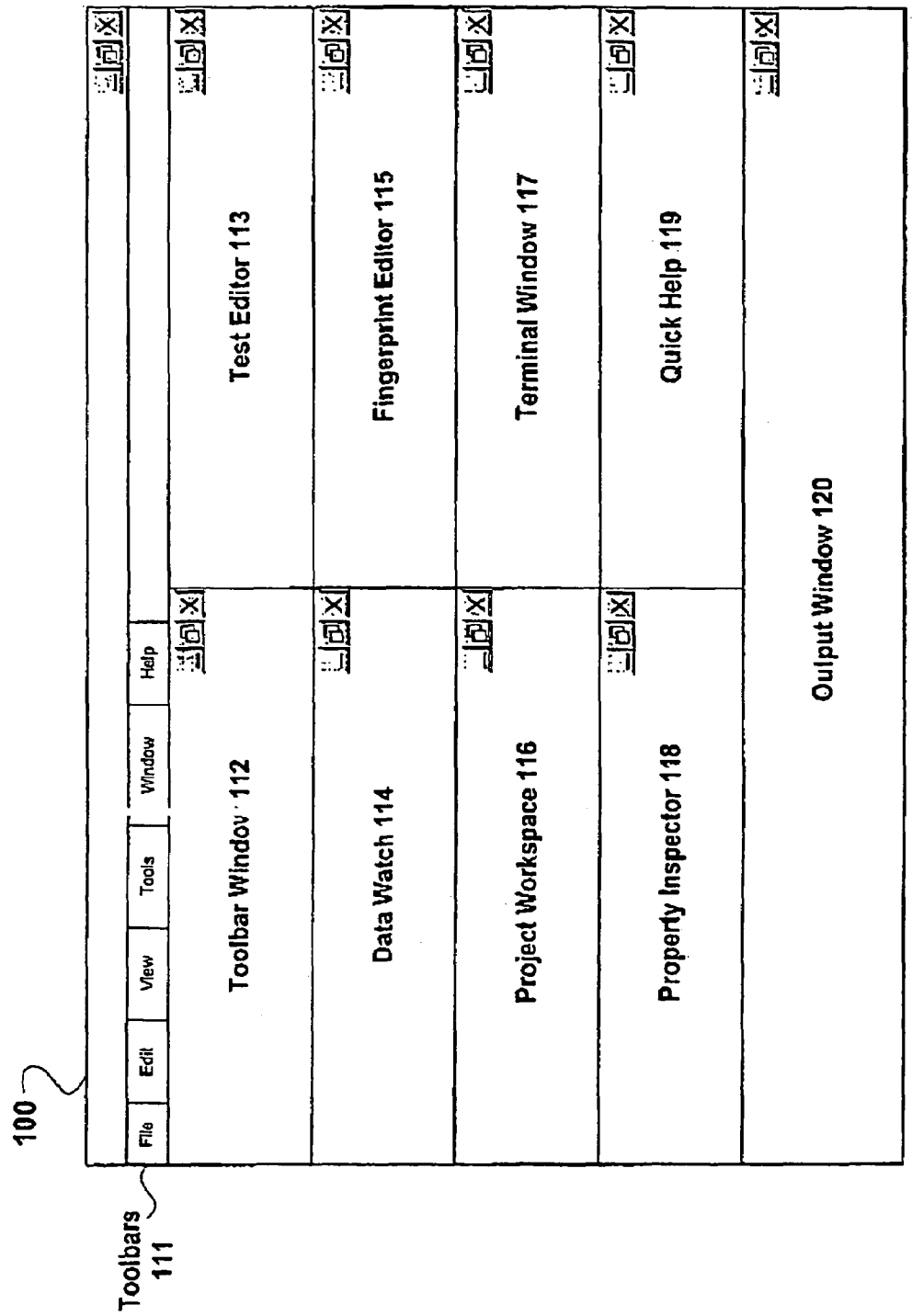
FIG. 1 is a screen shot of the developer with various windows open.

To assist in an understanding of the present invention, the following terms are now described:

Action Reasoning—Algorithms that can string together sequences of actions according to the preconditions and effects of each individual action in a sequence.

Knowledge Representation—A method for describing knowledge in a precise way. Knowledge is a kind of data that describes some world and that can be used to make inferences about the described world.

Plan Domain Learning—A sub-field of Machine Learning that deals with learning knowledge database structures corresponding to plan domain formats. Observations are made of an agent's behavior. The observations are mined to infer Plan Domain structures.

Propositional Planning—The rules that determine an action's pre-conditions and effects are propositions about the state of the world.

Decision Theoretic—Refers to applications of Decision Theory, such as Decision Theoretic planners. Decision Theory is Probability Theory added to Utility Theory.

Probability Theory—The theory of probabilities. Used by AI researchers and statisticians to predict future results from current data.

Utility Theory—Assesses the likely usefulness of a particular test or action.

Mutex—An abbreviation for the term "Mutual Exclusion", referring to two propositions or two actions that interfere with each other. It is impossible, for example, for a rocket to be on the earth and on the moon at the same time. These propositions regarding the state of the rocket are therefore mutually exclusive, i.e. mutex.

Backward Chaining Algorithm—A method of problem solving whereby a solution is determined by reasoning backwards from the goal. Also known as Means-End Analysis.

The Blocks World Problem—A classic planning problem where a set of blocks on a table must be rearranged into a target configuration.

W3C—World Wide Web Consortium: An organization devoted the development and promotion of standards for the Web.

Description Logic—A specific kind of reasoning system that deals with the descriptions of things. Description logic is concerned with issues such as inheritance and set membership, and is emerging as a valuable method to address semantic mapping for data integration problems.

Semantic Web—A new initiative promoted by the W3C that integrates Description Logic, the worldwide web and XML protocols. The goal is to achieve autonomous web agents that can speak to each other using a common language, with a common reasoning mechanism, and a common method to define information.

Constraint Programming—An emerging programming technique whereby a solution to a problem is declared as a set of constraints on variable values within a system. A special program called a constraint solver can be used to analyze the constraints to determine a set of variable assignments that conform to the constraints.

Polynomial Time—If the number of objects to be considered in a problem is N, Polynomial time problems can be solved in approximately K steps where K>Log N and less than NM and where M is some constant. Since M could be a big number, not all polynomial time problems are easy. The field of Complexity Theory addresses issues regarding the time and space required to solve problems.

Interleaved Plan—A plan requiring steps that move away from the goal prior to steps that achieve the goal.

Hierarchical Task Networks—A set of tasks, where some tasks can be broken down into sub-tasks.

Disjunctive Planner—Allows sets of conflicting actions to live in a particular time step.

Heuristic Search—A heuristic is an algorithm producing a particular result that is not easily proved mathematically, but that can be verified empirically. Problem solving in AI often involves search through a large space of possible answers to a complex question such as "What is the best next move in a chess game?" Heuristic search applies heuristics at each point in the search to determine the best next path to follow. In chess problems, for example, a useful heuristic is the piece value count at any point in the game.

Machine Learning—A field in AI dealing with the problem of automating the development of systems. Machine Learners are programs that can construct knowledge structures or programs that can be used to achieve certain desired results. Voice print recognition is an example of Machine Learning. After a sequence of training events, a database of recognition rules can be devised to automatically detect an individual's voice.

Backtracking—When an algorithm has to undo a series of steps in order to restore an earlier state, this is known as backtracking. Search often involves some form of backtracking, where various solution paths are attempted, but are undone if success cannot be achieved.

Branching Factor—When searching through a space of possible solutions, the number of choices at any given point is called the branching factor. In chess, for example, the branching factor is the number of next possible moves.

Intelligent Agent—Software with dynamically generated run-time behavior planned using a model.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention. It is to be understood that structural changes may be made and equivalent structures substituted for those shown without departing from the spirit and scope of the present invention.

The invention comprises a system and method of seamlessly integrating information access over extended networks using intelligent systems.

Figure 6:
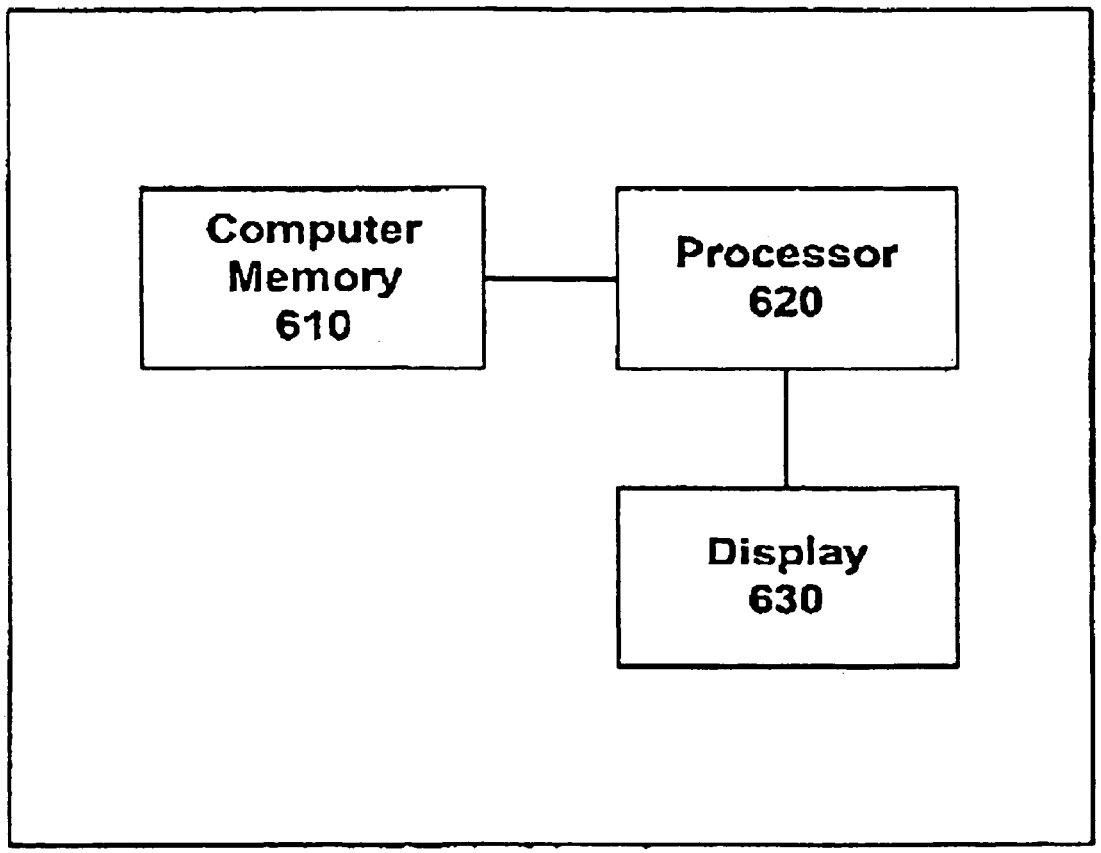
FIG. 6 is a block diagram of a computer system capable of running the developer.

In a preferred embodiment of the present invention, models that encapsulate information on how remote applications are controlled and data is accessed are created to be used by a runtime agent that intelligently reasons out goal-oriented plans and execute tasks to solve problem statements generated by a user interface. The models and runtime agent are stored in computer memory 600, as shown in FIG. 6. Processor 610 accesses computer memory 600 to retrieve the models and runtime agent as necessary.

Models are created in developer 100, as shown in FIG. 1, to be used by the runtime agent. Developer 100 is also stored in computer memory 600; processor 610 accesses computer memory 600 to display developer 100 on display 630. The runtime agent will reason out a goal-oriented plan to solve the problem statement. The runtime agent generates, at runtime, a series of tasks that will accomplish the goal of the problem statement based on the models. Tasks that the runtime agent execute to accomplish the goal are navigating, retrieving data from, and writing to terminal-accessible systems, reading and writing data to terminal-accessible system screen lists, reading and writing data to SQL databases, and reading and modifying/populating an HTML document. Runtime agents can also perform actions typical of statically programmed software such as read from and write to files, modify its own database, make CICS transactions, transform data.

To create models that allow the runtime agent to accomplish this, within developer 100, the user has access to a standard toolbar 111, a test editor toolbar 112, a test editor window 113, a data watch window 114, fingerprint editor 115, project workspace 116, terminal window 117, property inspector 118, help window 119 and an output window 120.

The standard toolbar 111 and the editor toolbar 112 allow easy access to commonly used features. The test editor 113 allows the user to check how complete and accurate the models are by accessing the runtime agent and simulating the tasks it would be required to perform at runtime. In addition, the test editor 113 generates a graphical representation of navigation plans as well as allowing the user to execute the plans and observe the interactions the runtime agent makes with the SQL databases, terminal screens and web pages. The display and/or execution of plans can also be illustrated step by step for debugging.

Data watch window 114 allows the user to view the current value for any data member in the current project. The fingerprint editor 115 is an intelligent technology used for terminal screen state recognition. It uses a set of predefined patterns and regions as a default fingerprint schema that work for most terminal systems.

The project workspace 116 allows the user to view and access the various elements of a project within the sessions tab, the project tab and the templates tab. The session stab is used to manage connections to live host systems or simulations of live host sessions called offline sessions. The project tab is used to manage a project when building an access model to add or edit objects, state members, methods, instructions, data objects and data members. The templates tab is used to create and configure listmap objects. Listmap objects allow the user to navigate through terminal screens that present data in lists, and manipulate the data retrieved from lists.

Multiple systems can be controlled within a single model. However, rather than requiring a programmer map the host application and create an itemized description by writing down each detail, developer 100 simplifies the process. The following discussion will explain how developer 100 simplifies the process of creating an SQL database access model, a terminal-accessible system access model, a web page access model and a runtime agent that can use each of these models, or a model containing any combination of these applications, to intelligently navigate the various systems.

Before any models can be created, developer 100 must start a new project. Once the new project is open, the user must start by modeling one of the systems to be integrated. The method of modeling an SQL database, terminal applications, and web pages are discussed, by any type of application can be modeled.

Figure 2:
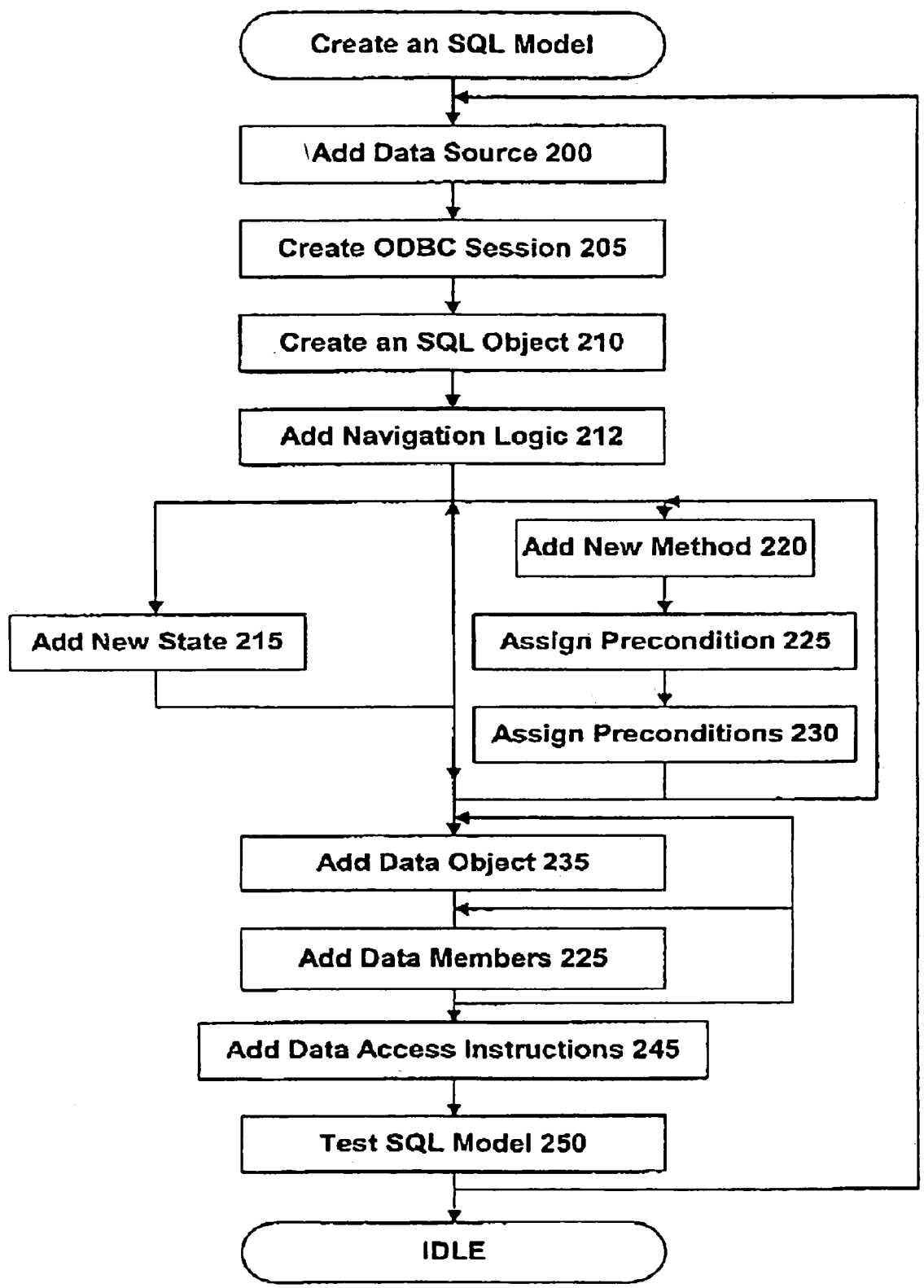
FIG. 2 is a flowchart of the creation of an SQL model.

A model for interacting with an SQL database allows the runtime agent to plan instructions for querying an SQL database. The instructions manage the database connections as well as the SQL queries. Before such a model can be created, the data source must be added 300 to the list of available databases, as shown in FIG. 2. The data source is the database that a model is being built to interact with.

Once the data source is added 200 to the list of available databases, the user must set up developer 100 to view the data source activity while developing the SQL model.

Once developer 100 can view the data source, an SQL model can be built. The first step is to create an SQL object 210. An SQL object contains the information necessary to facilitate reading from and writing to the data source. It contains the methods and data structures—what information comprises each data source entry and the properties of each piece of information.

Next, navigation information must be added 212. Navigation information allows the runtime agent to plan navigation paths that achieve goals. To add navigation information, state members 215 and methods must be created 220. State members represent a condition or position of the system. A method groups instructions, which are definitions of operations that are performed—instructions to go from one state to another.

Once, at a minimum, start and finish states are created 215, methods need to be created 320. The methods contain the instructions that the runtime agent will execute in the navigation. Once the new method is added 220, the user must enter a precondition 225 and a post-condition 230 for the new method. The precondition specifies that for the selected method, the selected state is the is the initial point for navigation. The post-condition specifies that for the selected method, the selected state is the end point for navigation.

Once the preconditions 225 and post-conditions 230 are specified, a data object may be added 235. A data object stores intermediate data that can be used to write to a system—i.e. the data retrieved by the instructions. Data objects contain data members. Data members are variable where information may be stored, for example, data retrieved from an SQL query; where data to be transformed is stored; and data that will be written to an external system is stored. The runtime agent can read data from and write data to the data members. Once the data object is created, it appears in project workspace 116. Next, data members must be added 240 to the data object. Data members are information, such as, ID, password, name, address, etc. For updating information, such as incrementing an entry in a database, data members are not necessary, constants can be used.

After the data members are added 235 to the data object, data access instructions must be added 245. Data access instructions are definitions of operations that can be preformed; they are contained within methods. It is in the data access instructions that SQL queries are written.

The steps described above can be repeated as often as necessary to accurately model the interaction with an SQL database. In addition, the interaction with multiple SQL databases can be modeled and added to a project if more than one SQL database must be accessed. Once an SQL model is complete developer 100 can test it to make sure it works properly. Output window 120 displays feedback while the SQL model is tested. At the same time, data watch 114 allows the user to view the current value for and data member in the project. The runtime agent plans navigation paths that will execute the methods and instructions required to connect to a data source and execute SQL queries.

Figure 3:
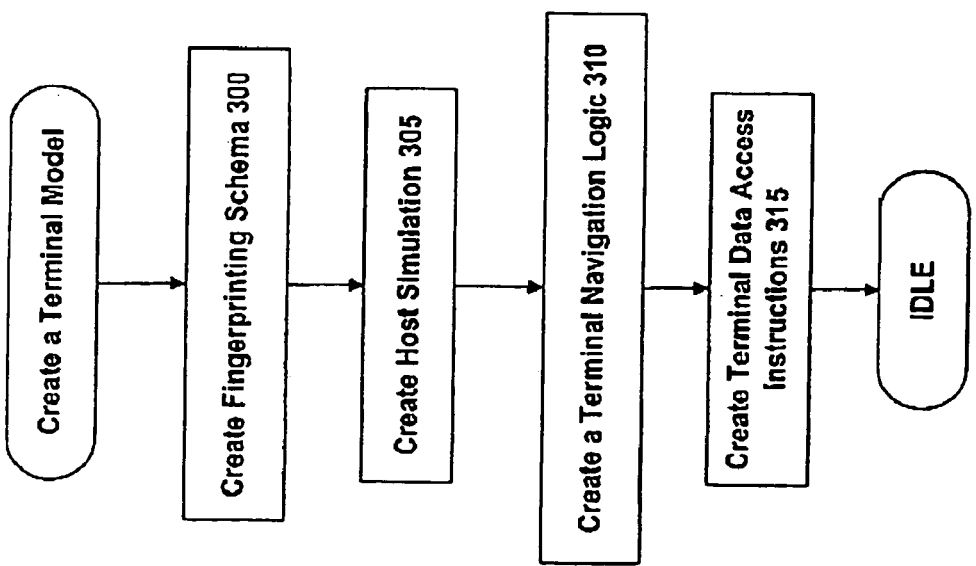
FIG. 3 is a flowchart of the creation of a terminal-accessible system model.
Figure 5:
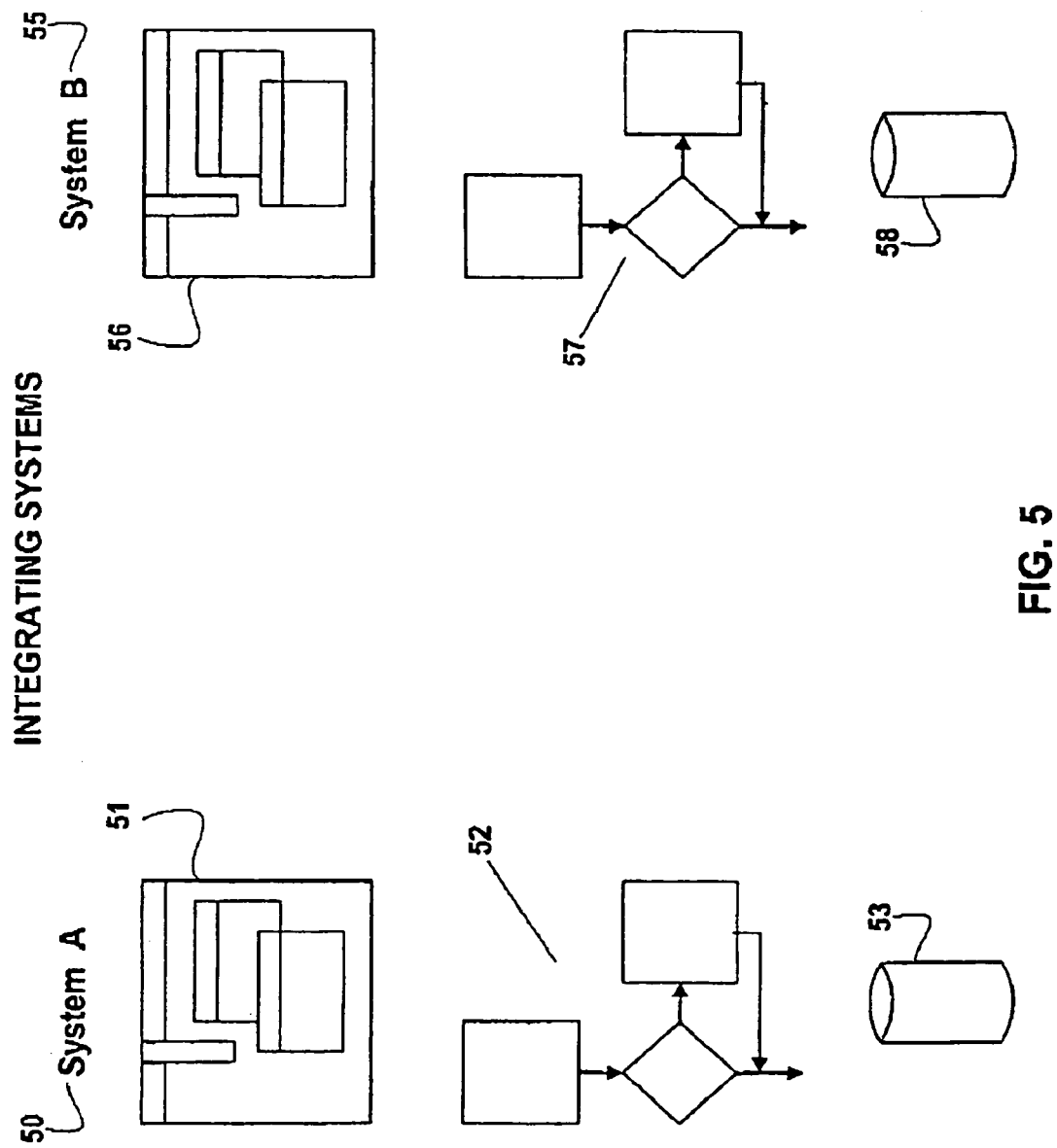
FIG. 5 is a block diagram of two computer applications.

In addition, a user can create a terminal access model. A terminal access model allows a runtime agent to plan instructions that need to be executed to control terminal applications and systems and read and write data to the screens. As seen in FIG. 3, the first step in creating a terminal access model is to create a fingerprinting schema 300. Fingerprinting schema are sets of rules that define how the fingerprinting system functions. Fingerprinting is terminal screen state recognition. Developer 100 uses a predefined set of patterns and regions as a default fingerprinting schema. This default configuration will result in accurate screen recognition for most host systems and applications, but can be reconfigured for special cases.

Fingerprinting relies on matching pattern and region information to terminal screens, based on a decision tree. The patterns are special conditions that evaluate a terminal screen by looking for a features, for example text strings, dates, times and character attributes such as color. Each feature can be searched for in several ways including exact position matches, region matches, exclusion, substring matches and so on. A pattern is captured and can be compared to a string to return a true or false for a match or can be evaluated more generally, for example, is there a date (regardless of what date) in a particular portion of the screen. The patterns can be evaluated as logical expressions. The values returned are used to navigate the decision tree.

The regions are definitions of sections of the terminal screen. The sections can be defined in several ways including set character lengths and blocks that span multiple rows and columns. When a region is evaluated, a string of text captured from the defined region is compared to string to return a value. The values returned, in conjunction with the values from pattern comparisons, are used to navigate the decision tree.

There are also special region types that result in predefined integers or special codes being returned.

The decision tree used for the fingerprinting schema uses a region and pattern combinations for each node. As the first node of the decision tree is traversed, the pattern for the node is evaluated; if the pattern is false, then the next node of the decision tree is traversed. If the pattern for the first node is true, then the region for the node is evaluated, and the result is stored as a fingerprint "element." The node of the tree that the screen matched and the element that was stored are the fingerprint of the screen.

To create a decision tree, unique features of each screen within the terminal application need to be identified. Screens can often be identified based on features they share, such as the titles on menu screens, screen ID numbers, or the system date or time displayed on the top or bottom line. The fingerprinting schema, however, should not identify regions of a screen containing data that dynamically changes.

If the default fingerprinting schema does not work for a particular set of terminal screens, the user can modify it by changing the patterns and regions so that it will work for that set of terminal screens.

A host simulation can be created 305 to perform offline tests. One way to create a host simulation is activate the recorder. The recorder is a feature that intelligently creates host simulations and navigation models by capturing user interaction with terminal applications and systems. The recorder uses the fingerprinting schema to create fingerprints for each new screen it recognizes while navigating. The recorder captures offline screens and creates corresponding terminal objects and state members in the terminal model, captures user interaction with the host as offline logic items, and creates corresponding methods and instructions in the terminal access model. It also creates data objects and members for any terminal screen unprotected regions it encountered while recording. All of these items are labeled using an intelligent naming mechanism based on the elements captured during fingerprinting and other screen features.

The terminal host simulation created by the recorder can be used to test the navigation logic in the terminal model without having to connect to the live host.

Another type of model is an HTML control model. An HTML control model allows the runtime agent to plan instructions that need to be executed to retrieve HTML documents and extract data from them or to write data to a web server. Developer 100 uses two HTML-specific instructions to accomplish this--send HTTP request and extract HTML data.

There are two kinds of HTTP requests. The send HTTP request instruction allows the runtime agent to send an HTTP request and store the HTML document returned. The HTTP request can be written manually or can be generated by developer 100 and modified as required. The extract HTML data instruction allows the runtime agent to extract data from an HTML document retrieved using the send HTTP request instruction. Developer 100 intelligently extracts structured and unstructured data into data objects and data members. This data can then be retrieved by the client application or used by the runtime agent.

Figure 4:
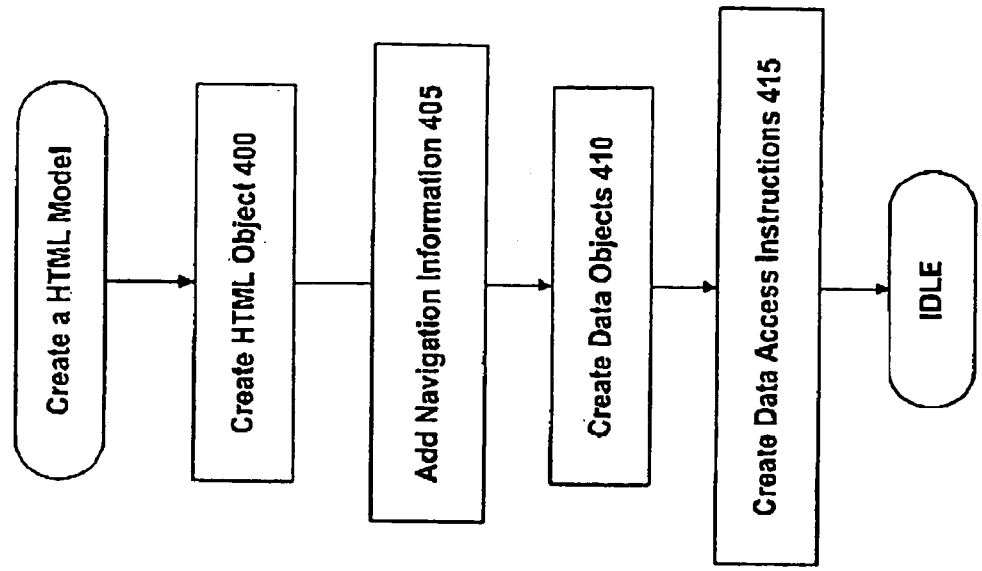
FIG. 4 is a flowchart of the creation of an HTML model.

As seen in FIG. 4, creating an HTML model has four steps. The first step is to create an HTML object 400. An HTML object serves as a container to encapsulate the methods and data structures (data objects, data members, and state members) created to extract data from an HTML document.

Once the HTML object is created 400, navigation information must be added 405. Navigation information allows the runtime agent to plan navigation paths that execute the methods and instructions. Adding navigation information comprises creating state members and creating a method. State members represent a condition or position of the system. A method groups instructions, which are definitions of operations that are performed (i.e. a method contains instructions to go from one state to another). The state members, method and instructions created are used by the runtime agent to plan navigation paths that execute the data access instructions.

The next step is to create data objects and members 410. Data objects and their members are used to hold various types of information such as the HTTP request information required to retrieve the HTML document and the data extracted. Because HTML data can be formatted in structures such as lists and tables, developer 100 supports the extraction of data from web pages into specially-named sets of data objects and data members that maintain the structural context. One object is created for use by HTML instructions while another stores the data from a web page.

Finally, HTML data access instructions must be created 415. Data access instructions are added to the method to send an HTTP request and extract data from the returned HTML document. HTML data access instructions are definitions of operations that can be performed.

In a preferred implementation, in order to act, an agent must not only know the actions that must be performed, but also how to perform them. In a fully enabled intelligent agent, a plan domain model must contain more than planning information; execution information must also be contained. As an example, consider a navigating agent that is going to navigate over a series of mainframe screens. The plan domain model would hold actions such as "Logon to Main" "Main to Customer Entry", would associate those actions with the appropriate screens and screen states. In addition to this information, instructions indicating how to make these transitions must be stored. The high-level form of an action plan represents a plan according to the classical notion. However, in an intelligent agent, each action must contain individual instructions, and the graphical plan may be expanded to reveal the instructions.

Figure 7:
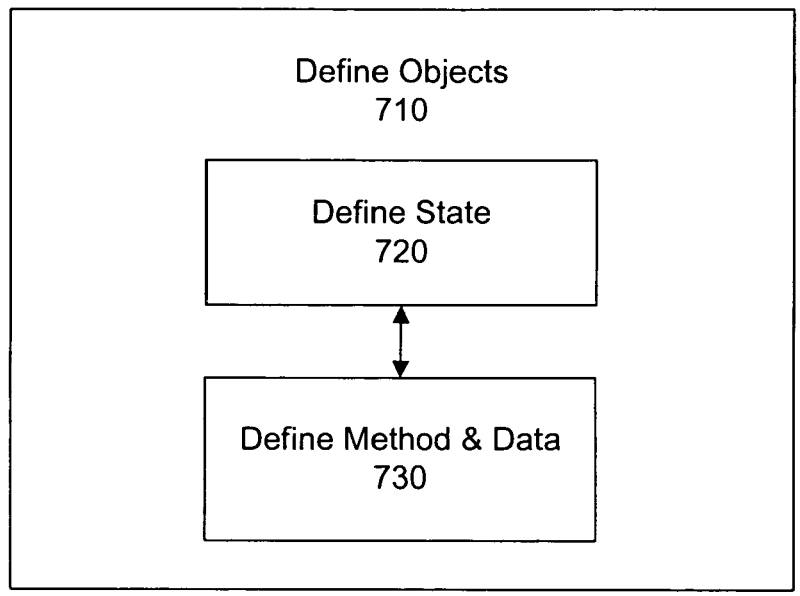
FIG. 7 is a flowchart of the creation of a planning model.

Accordingly, the present invention system integrates planning with executing. Specifically, the present invention can take a generated plan with the associated actions, and will use the instructions to implement run-time behavior. As depicted in FIG. 7, the main ideas involved with accomplishing this are operator instructions, state behavior, and condition monitoring. An embodiment of the present invention also incorporates the notion of a distributed server that can perform the desired behavior at run-time, as described in greater detail below. Run-time execution (also referred to as navigation) requires that each planning operator contain a set of instructions to be used to implement the operator during run-time. During run-time, the states that are encountered by the navigator may require special behavior. An error state, for example, indicates that a state has been achieved that is undesirable in any context. One possible reaction of an agent to achieving an error state is to re-plan. The ability to re-plan based on unexpected conditions is a unique feature of an embodiment of the present invention among integration system vendors. Planning propositions are used during plan execution to determine if an agent is on track or off track in a given context. For example, if you plan to open the door with your keys, but notice that the keys are not in your hand, you may have to re-plan because your planned conditions are no longer met.

There are two kinds of instructions used within embodiments of the present invention. First are the direct instructions such as Set-Cursor and Write-Data-Member, which are well known and generally corresponding to full instruction set found in most procedural programming languages. Second, embodiments of the present invention support the use of Active Scripting. Scripts and Instructions are attached to operators, and are used by the run-time component of an Intelligent Agent under direction from a plan. It is not within the scope of this application to discuss how planning and execution work together, however, it should be clear that the power of planning allows truly intelligent behavior within an executing agent.

Thus, the present invention provides for integrated planning and executing. Embodiments of the present invention further include a tool that practically applies this concept to real world environments. Additionally, through the use of adaptors, an embodiment of the present invention allows for the creation of Intelligent Agents that are able to access a variety of systems, and which can easily be extended through the use of scriptable operators. It may be noted that Active Scripting is a powerful mechanism for solving programming problems, and is the underlying system used to support Active Script Pages used by Web developers all over the world for developing highly interactive web pages.

Business Process Automation and Enterprise Application Integration have merged into a newly created space that can be described as System Integration Development and Deployment Tools. Major software vendors have developed tools that fit into this category. This area has become a well-defined software space and integrates the following technologies: process mapping and automation, middleware, data mapping and transformation, adaptors and access methods. Process mapping is difficult partly because it is so similar to programming. Each step within a process must be carefully arranged into a set of interlocking tasks. Each task represents some function that must be performed and must be assembled so that the pre-conditions of one task match the effects of another. Process mapping is generally done using a graphical tool, although there is no requirement for a graphical editor. Like programming, process mapping requires highly trained specialists to design, build and maintain a system. The main advantage to process oriented architecture over standard code is that process oriented systems are much easier to modify than standard systems.

Although process oriented architecture represents a significant advancement over conventional development, there are still many improvements to application development tools that these methods do not address. The introduction of planning to process oriented architecture revolutionizes this field by providing a powerful declarative framework for process models. The standard technique for designing processes involves specifying process start and end points, determining the tasks to be performed, and manually attaching all the tasks together, mapping the start point to the end point. In planning, the notion of a plan as an ordered set of tasks directly corresponds to the notion of a program and to the notion of a process. This fact can be used to automatically generate processes from a database of properly defined tasks. Furthermore, this ability to dynamically generate processes allows for a revolutionary approach to handling exceptions within programs and processes. Because a planner can derive processes, exceptions can be handled through re-planning. By some estimates, 70% of development time is spent dealing with exceptions. A method to simplify exception handling provides a huge productivity gain.

As described above, the goal of automating services remains challenging despite decades of investment in integration technology and process re-engineering. Straight-through processing and zero-latency business processes are necessary but difficult IT objectives given the cycle of new systems, new processes, new partners and new standards found in present business environments. Service Oriented Architecture (SOA) is known, emerging technology to enable disparate systems to interact—coupled with process automation SOA is a compelling platform for building integrated systems. But processes that coordinate multiple services are complex to build and maintain and conventional process modeling techniques do not enable the dynamic behavior required for goal-oriented services. SOA is a framework for building systems that interact with each other in environments where applications are completely distinct, i.e. built with different development tools, different languages, implemented on different systems and run in a completely independent manner. SOA employs an open and standard way for systems to communicate. These methods have become more important recently due to the increasing worldwide reliance on software technology and thus the growing base of applications that must interact. But SOA is not a complete architecture and there does not yet exist a full complement of technologies that satisfactorily address all the relevant issues SOA encompasses. In particular, complex systems that require coordinating many services and services that are goal based are not directly addressed within the SOA framework.

SOA Models incorporate well-defined components into a single framework with clearly specified methods for interaction. The components of SOA can be modeled as business objects and business events that take place for some purpose. A business event occurs when one person or system requests something from another person or system. Business events can be simple or complex. Complex events trigger processes that are comprised of sequences of business events. Business Events can be customer orders, refund requests, help desk requests, inventory lookup, product orders, billing etc. SOA models map these business event sequences into processes. The models could be implemented with process models using conventional process modeling technology, or they may be implemented by hand within code. There are advantages to either approach, but a model based methodology enables are far greater degree of flexibility and maintainability.

Process based SOA models provide a powerful integrating framework; however, static processes do not adequately handle the complexity of a complete service model. A more powerful framework is required that takes into account the events of a service and the goals that a service is designed to achieve. Process models also are limited in their ability assist analysts and developers with process construction, process change and exception processing. One example where static processes are limited is in the facade service (explained in more detail below.) The facade service wraps existing infrastructure with a service invocation framework. In situations where system specific "Adaptors" must be hand coded this can introduce significant complexities within the service model. Common adapters and standardized transports simplify the problem of facade services but do not help with coordinating multiple services. This is particularly problematic when services from more than one organization are used.

Accordingly, one implementation of the present invention depicted in FIG. 7 provides a Service Coordination Framework (SCF) 700 to implement a model-based method for delivering automated services without coding. SCF 700 extends the concept of the SOA by introducing methods that link Service Oriented Architecture with advances in the field of Intelligent Systems to provide a flexible and powerful method for delivering automated services. Thus, SCF is an extension to the SOA concept that introduces the concept of service assembly as an answer to some of the more challenging problems faced within SOA frameworks.

The SCF 700 combines Service Oriented Architecture with Intelligent Systems techniques to address some of the shortcomings of process model based architectures. A main issue of concern is the lack of dynamic processing capability offered by the process model framework. Intelligent Systems techniques include methods for handling goal based processes using planning. These methods have been developed for years and have been successfully applied in the fields of enterprise resource planning, task scheduling, operations optimization, game playing and many other applications. The innovation that SCF brings is to recognize that process models can be automatically assembled using Intelligent System planning methods.

Referring again to FIG. 7, planning models are very similar to process models: models consist of actions chained together in a way that specifies which actions follow which other actions. Actions are often assigned to roles. Actions also operate on business data. SCF is more formal in the definition of actions. An SCF model 700 consists of a set of service objects (initially defined in step 710) that have some kind of state (defined in step 720). The state of service object can be explicitly calculated at any time by examining the state variables of a service object. An object may also contain methods and data (defined in step 730). Methods correspond to process actions with one some exceptions. In SCF 700, method preconditions and effects only refer to the state variables of a service object. This restriction is significant because it allows the planning algorithms to be used for deriving process models based on the pre and post condition rules of the planning model. While the process-based SOA simply requires a service invocation, which triggers a process engine, SCF 700 is slightly more complex. An SCF invocation triggers a planner that generates a process model with some extensions. SCF replaces the process engine with a component we refer to as a navigator. The distinction between a process engine and a navigator is that the navigator can determine at any time if a process is executing correctly based on the planned states required of the service objects and can trigger exception processes, exception plans or can re-plan completely if necessary.

As described above, the present invention provides several different types of possible agent classes that may be specified in Step 720. The class member functions execute intelligent navigation and data handling. These functions are further grouped by their function type. Following is a non-exclusive list of those types:

"Connect Functions"
"SetClientTimeout"
"Cursor Functions"
"Terminal Window Functions"
"SQL Functions"
"Read Functions"
"Write Functions"
"Error Message Functions"
"Synchronization Functions"

Thus, there may be three main categories of a class, implemented in Java, over a using a communication function to call to a remotely stored action, or locally accessed C++: application.

In another embodiment, the present invention provides a planning tool that assembles workflows using an automated reasoning process. In particular, several planning objects are created, each having a defined state conditions which are used to automatically link the different objects based upon state assignments. The state conditions for the objects can be updated dynamically to adjust for previous actions or changes in circumstances. The states represent a series of Boolean expressions that represent required precursor for actions associated with each object as well as results from these actions. In this way, the states are used in both planning and navigation of planning a workflow. Possible states include and error, exception, and user defined. A loop-type [described in greater detail below] allows the repetition of action(s) as long as specified in the state definition. Another type of state, a pattern type, functions in screen navigation, and invokes particular actions at run time by evaluating a pattern on a navigation screen.

The workflow is created in accordance with the discrete series of Boolean expressions contained in the states. Furthermore, each state contains a predefined pre and post conditions, which may be used to assemble the workflow. An initial and desired end conditions are defined as well. Specifically, the workflow is created using a iterative process in which, starting with initial conditions, determining which object can be next performed, and then modifying a current state express to account for the performance of any object. This process is repeated until the desired end result is achieved. The different possible paths for achieve the end result are noted and the compared, and form the possible universe of paths.

In one embodiment, the objects may be used to define composite services which are loosely coupled, in contrast to traditional objects that invoke local actions. In this way, multiple actions on multiple computers may be accessed and employed to generate AI planning through the defining of a composite service that is composed of several services. This allows for the greater planning power as actions may be grouped if possible.

In another embodiment, submodel invocation is used to invoke another processes. In this way, the present invention may be used to wrap the plan domain such that the plan is abostract. In particular, an agent may invoke one or more agents that share a portion of its knowledge base. In this way, tasks can be apportioned opaquely as needed. One plan cannot control the whole knowledge base. Information is restructured so each agent only accesses information as needed perform particular activities. Information can be restricted to external agents that other agents can incorporate and invoke as needed The methods used in SCF for coordinating multiple services are similar to the techniques used for factory automation. By treating services as factory tasks, SCF solves the assembly and coordination problem using planning. Services that occur during the course of a system attempting to accomplish some goal must be combined with rules that connect sequences of events together. Service models have conditional branching (and looping) which must be clearly specified and understood within a use case context. The decisions that are made by a person delivering a composite service are based on the rules surrounding the use of a sub-service and the possible states each sub-service can be in. Within a SCF, the goals and rules of service must be formally specified to enable both service assembly and service execution.

Businesses are goal directed—every business event takes place (or should take place) because some person or system is attempting to accomplish some goal. Conventional SOA models or code-based systems do not account for the goal directed nature of services. The SCF scheduling technique, however, easily handles goals within generated schedules. SCF service models allow the definition of business rules that define the contexts where an event can take place (like process pre-conditions) and define the new context of the business once the business event has occurred (similar to process post conditions). SCF uses these rules to plan out a business event sequence that will accomplish a business goal. The key benefits to the SCF approach include automatic exception handling, model checking, simulation, service creation and optimization.

SCF models are far more powerful than simple process models and so the extra work involved with setting up the rules is worth the investment. SCF models reduce development time because they automate service assembly and allow run-time service coordination. Another useful property of SCF models is that they can be partially generated using a recording process. This is significant because a SCF recorder is able to automate much of the work to construct a SCF model. In comparison to building models by hand, SCF recording provides a significant advantage.

Planning works by automatically searching through chains of method applications that will achieve the goal from the initial conditions. One way to think of this technique is to compare it to finding a map using an automated mapping service. The mapping service maintains a database of all possible driving destinations within North America. Each destination is attached by one or more roads to other destinations. Given some starting point (initial conditions) and some ending point (goal conditions), the mapping service is able to chain through all possible connecting paths and determine the optimal sequence of roads that will get you from start to finish. Similarly, an SCF model is aware of all possible service object states and the way that they relate to each other through methods. So given a starting and an ending state, the planner is able to chain together all possible methods will achieve the goal from the starting conditions. All possible paths combine to form a process model.

SCF processes occur in any situation you would normally consider a standard process. So consider the customer order process. Here we have some service objects that would include the customer, the order, the product and a credit service. The customer state includes in good standing, good credit, registered with methods for looking up the customer, checking credit or registering the customer. The order state includes received, validated, error, processed with methods for accepting the order, validating it, processing it etc. The product state includes in-stock, priced, and ordered with methods for checking stock, pricing the product and ordering the product from a supplier. From this list it should be clear, that the order process is like a standard process. Using planning it is possible to automatically derive all the processes required to handle an order and to deal with the exceptions. Additionally, processes do not need to be updated since adding any new object or changing its definition will automatically cause a rebuild of all associated processes.

Another example of a dynamic process is the facade service that involves the use of presentation layer interface. Consider a customer lookup system composed of a set of 3270 screens. Each screen is a service object with unique states and methods. The methods comprise a map of all possible screen states and methods allowing any screen navigation sequence. During run-time, if the presentation layer does not behave in expected way, process based solutions will fail. The dynamic process of SCF does not fail because it has the ability to completely regenerate if necessary.

Overall, SCF 700 is a new architecture extending SOA in subtle but significant ways, enabling an entirely new breed of systems that are adaptable, more robust, and much easier to maintain than conventional SOA based systems. SOA is quickly being adopted in many areas of IT where it is possible to quickly deploy new services. But adapting to existing infrastructure is still a problem that will hamper the growth of SOA. The SCF framework addresses this problem by enabling designers to rapidly model existing systems by direct model development or by recording. The SCF use of scheduling automates the assembly of run-time SOA systems and provides a method for efficiently coordinating multiple services into a composite service.

Thus, automated Process Planning, as provided in the present invention through the SCF 700, works by stringing together tasks from a task database using multiple possibilities at each decision point to build conditional behavior. An example is now provided to illustrate these aspects of the present invention. Consider the process of handling a purchase order (PO). A typical purchase order handler might employ the following tasks: Receive PO, Credit Check, No Credit Message, Inventory Check, Send Confirmation, Order Supplies and Send Back Order Notice. If the tasks are stored in a task database, the purchase order processing plan can automatically be derived by chaining together each task based on its pre-condition and effect. For example, the only task that makes sense as the first task is the Receive PO task, since nothing else can be done until a PO is received. The database would therefore contain the Receive PO task with a pre-condition that indicates a PO arrival event. The actions within the Receive PO task would load the PO information into data structures easily accessed by the other tasks. The effect of the PO task would be that the PO is ready for processing. In this particular scenario, the only task that could apply is the Credit Check task. That is because other tasks in the database have pre-conditions other than those provided as effects from the Receive PO task. Since the result of a credit check cannot be predetermined, there are two alternate paths that handle the result. Similarly, an inventory check result cannot be pre-determined and thus there are two alternate paths. So with a properly configured database of tasks, it is possible to automatically derive a complex process by providing a planner the starting point and the ending point, as well as all of the tasks that can be used to achieve a goal.

A pictorial way to understand this result is to think about the process in terms of puzzle pieces that must fit together. If it is imagined that each task has a pre-condition component that must match the effect component of the task before it, the planner can be understood as a master puzzle solver that simply searches for all possible puzzle assemblies until it finds an assembly that fits.

The most significant advantage to using planners to derive processes is the ability to leverage task databases that have been derived from trace recordings of expert user behavior. Conventional process development involves time consuming and difficult analysis of many tasks to determine the exact nature of how observed tasks fit together. However, the present invention may observe task behavior and to use that task behavior to infer task pre-conditions and effects. This technique may be applied to task recording within the Legacy System Terminal Data Stream environment. A recorder has been constructed that can observe the activities of a user working on a Legacy System. The task information, along with the instructions required to perform the task, are stored in a project. Task pre-conditions and effects are derived from the observed expert system user's ordering of tasks. Propositions are generated in such a way that the observed ordering can be regenerated. Conditional activity corresponding to disjunctive branching in a process is derived from task activities that may not generate desired results. Alternatives are sought, and alternate branches to a plan are inserted based on plans derived to handle variable behavior. Conjunctive branching is derived from information in the planning graph that would indicate that multiple actions within a given planning step are order independent.

Learning States

In one embodiment of the present invention, the state definition in Step 720 may include a defining of learning states, that adapt according to various actions/occurrences, as needed for planning. An algorithm for defining learning states is now presented. The environment to learn is a tuple <N,S,A,P,E>, where:

N is a set of nodes.
S is a set of states where each node has its own set of states.
A is a set of actions where each node has its own set of actions.
P is a set of pre-conditions where each action of a node has one state pre-condition.
E is a set of effects where each action of a node has an effect which is a state of a node.

The observed environment is a tuple <No,Ao>, where
No is a set of nodes.
Ao is a set of actions where each node has its own unique set of actions.

A trace consists of a string that begins with a starting node and continues with a repeating set of action node pairs. As described above, conceptually is like reading a map. A person starts with some position on a map, moves somewhere, and then ends up in a new position. The person continues this trace until reaching some destination. A training event consists of a set of traces.

If one is familiar with the traditional notion of state machines, this environment might not be entirely intuitive. However, it is more natural. Agents live in a world of observations and they take action according to the observed state of the world. Each observation that could be made of the world can be divided into sub-states. A node is like an observation. A sub-state of an observation associates a possible set of actions with the observation. Consider an agent attempting to open a closed door. The observation is of a particular closed door. The door may be locked or unlocked. The relevant action to perform to open the door is determined by the state of the door.

The algorithm for state separation uses a counting method. For every action performed to achieve a particular observation (node) if this action invokes a unique combination of actions from the observed state, the action must cause a unique state of the world that is not visible by the observation.

A <buildmap>used in the present invention is disclosed in Appendix A.

```
Private Sub BuildMap( )
'go to each trace
'try to build the tree
Dim i As Long
Dim anAction As String
Dim aNode As String
Dim previousNode As Integer
Dim targetNode As Integer
Dim currentNode As Integer
Dim currentAction As Integer
Dim previousAction As Integer
Dim newInArc As Integer
Dim newOutArc As Integer
Dim previousArc As Integer
Dim resLen As Long
Dim s As String
Dim eol As Boolean
Dim j As Integer
Dim countLines As Integer
```

-continued

```
i = 1
countLines = TraceList.ListItems.Count
For j = 1 To countLines
    s = TraceList.ListItems.Item(j)
    i = 1
    resLen = Len(s)
    eol = False
    previousNode = 0
    targetNode = 0
    currentNode = 0
    currentAction = 0
    previousAction = 0
    i = getNextToken(s, i, aNode)
    currentNode = findNode(aNode)
    While Not eol
        i = getNextToken(s, i, anAction)
        If anAction = Chr(13) Or anAction = "" Then
            eol = True
        Else
            currentAction = findAction(currentNode, anAction)
            i = getNextToken(s, i, aNode)
            If aNode = Chr(13) Or aNode = "" Then
                eol = True
            Else
                targetNode = findNode(aNode)
                newOutArc = addOutArc(currentNode, targetNode, currentAction)
                newInArc = addInArc(currentNode, targetNode, currentAction)
                If previousNode > 0 Then
                    joinArcs currentNode, previousArc, newOutArc
                End If
            End If
        End If
        previousNode = currentNode
        currentNode = targetNode
        previousAction = currentAction
        previousArc = newInArc
    Wend
    'i = getNextToken(s, i, aNode) 'should be chr(10)
Next j
End Sub
```

Looping

In a preferred embodiment of the present invention, the available states in step 720 include a conditional states such as a Looping state ("navigational looping"). Navigation Looping gives the ability to iterate parts of a plan multiple times. The model builder specifies the beginning and ending points of loops using a special type of state called a Loop State. Looping behavior is software governed in the present invention, and plans are generally not generate explicitly with loops in them. However, since the begin and end points of the loops are specified using states, model builders are still leveraging the power of the Planner of the present invention to implicitly create these loops.

In the present invention, Loop States are in fact any of normal state types (User Defined, Conditional, or Terminal). A Loop State is distinguished by its name, which typically includes the string_LOOP. The model builder specifies the beginning of a loop by referencing a Loop State in the Precondition state expression for a method. See the following examples:

EXAMPLE 1

InvoiceDisputesGenerated AND
SendDisputesEmail_LOOP

Here, the reference to SendDisputesEmail_LOOP effectively means 'Do While SendDisputesEmail LOOP is true'. Note that we can just as easily create a loop with a negative condition:

EXAMPLE 2

ReadyToReadInvoices AND
!EndOfInvoiceList_LOOP

In this case, the loop we are creating is 'Do While EndOfInvoiceList_LOOP is false'.

The model builder specifies the end point of the loop by referencing the same Loop State in the Postcondition state expression of a method. For example:

EXAMPLE 3

EmailSent AND !SendDisputesEmail_LOOP

EXAMPLE 4

InvoicesRead AND EndOfInvoiceList _LOOP

Note that the expected value of the Loop Stateshere is the opposite of what it was at the begin point. If the loop condition was 'Do While SendDisputesEmail_LOOP is true', then the loop is done when SendDisputesEmail_LOOP is no longer true.

The above described navigator uses the Loop State Stack to keep track of which loops it is in, when to reiterate, and where to start reiterating from. Each record in the Stack describes either the beginning or end point of one loop. It specifies the Loop State used to create the loop, the expected value of that state, the method that referenced the state, and where in the plan that method appears. Records are created and pushed onto the Stack when Loop States are encountered during the evaluation of the Pre- and Postconditions of methods.

The Stack Records mark loop begin points. Referencing a Loop State in a Precondition is not enough by itself to guarantee that the Navigator will record it as the beginning of a loop and push the record on the Stack. There are two further criteria that must be satisfied. In Stack Push Criterion 1, the Navigator must actually evaluate the Loop State itself as part of evaluating the overall Precondition state expression. The Navigator evaluates state expressions the same way procedural languages like C++ evaluate Boolean expressions: they evaluate each term in the expression in order of precedence just far enough to determine the final answer. This may or may not require the evaluation of every term in the expression. In Stack. Push Criterion 2, the 'And' group of the state expression that contains the reference to the Loop State must be true.

The following example has two 'And' groups ('And' groups are always separated by 'Or's):

EXAMPLE 5

(State1 AND Loop1_LOOP) OR Loop2_LOOP

In Example 5, if State1 is false, Loop1_LOOP will not be evaluated because, having already determined that State1 is false, it does not matter what value Loop1_LOOP has. Neither Criterion 1 or 2 has been met. Loop2_LOOP will be evaluated; whether it will go on the Stack depends on Criterion 2: Loop2_LOOP must have the expected value of 'true' in order for its 'And' group to be true. On the other hand, if State1 is true, Loop1_LOOP will be evaluated, but it must be true before it will go on the Stack. For its part, Loop2_LOOP will only go on the Stack if it is true and Loop1_LOOP is false.

As with Preconditions, referencing a Loop State in a Postcondition is necessary but not sufficient to push a record on the Stack. In this case, however, there is only one extra criterion: the Loop State must actually be evaluated when the Postconditions are evaluated (Stack Push Criterion 1 above). Stack Push Criterion 2 does not apply because, when the Loop State has not yet assumed its expected value at the end point (recall from Examples 1-4 that the expected value in the Postcondition is the opposite of what it was in the Precondition), we expect reiteration to take place. This means that, when reiteration is required, the Postconditions at the end point will often be false.

This raises an interesting point, since, ordinarily, the Navigator performs error and exception handling routines when Postconditions fail. To deal with this, reiteration takes precedence over error handling. That is, the Navigator examines the Stack to see if a reiteration is actually called for at this point. Only if one is not called for does the standard error and exception handling activity take place.

The present invention further supports nested loops as long as both the begin and end point records of each inner loop are between the begin and end point records of the next outer loop on the Stack, as in Example 6: The Loop State Stack:

> End Point Loop 1
> End Point Loop 2
> End Point Loop 3
> Begin Point Loop 3
> Begin Point Loop 2
> Begin Point Loop 1

Upon the completion of a method, after its Postconditions have been evaluated, the Navigator examines the Stack as mentioned above to see if a reiteration is called for. To determine this, the Navigator first tries to match the earliest loop end point on the Stack with the latest loop begin point. In the case of Example 6, it would compare End Point Loop 3 with Begin Point Loop 3. A match occurs when three criteria are met:

Reiteration Criterion 1: Both records specify the same Loop State.

Reiteration Criterion 2: The two records expect opposite values for that state (recall Examples 1-4).

Reiteration Criterion 3: The actual state value is the same in both records.

Note that if Criteria 1 and 2 are met but 3 is not, this simply means there was a loop, but it is now over and no further iteration is required. If there is no match, the Navigator tries the next earliest end point on the Stack. Eventually, either a match is found or there are no end points left to consider.

If a match is found, the Navigator examines the begin point record and resets the navigation to the specified method at the specified point in the plan. It then pops records off the Stack down to and including that loop begin point.

If no match is found, the Navigator still pops off all the loop end point records. If the current Postconditions are true, the Navigator proceeds to the next method in the plan. If the Postconditions are false, it performs whatever error and exception handling is needed.

The fact that nested loops are supported, and that multiple Loop States can be referenced in the present invention through in the same Pre- or Postcondition expression means that it is perfectly valid to create nested loops with the same starting and/or ending methods. In fact, it is possible to create a method whose Postconditions specify end points for loops whose begin points are in the Preconditions for the same method. The important point in situations like these is to ensure that the Pre- and Postconditions are written correctly to ensure that records go on the Stack in the correct order (see Example 6 above).

In the event that the Preconditions to a method are false, the Navigator will attempt to branch to another existing plan that has a method at that point whose Preconditions are valid. For example, where a branched plan comprises the performance of method 1, either method 2 or 3, and than method 4. This simple branched plan is really two separate plans the Navigator chooses between at run-time: (methods 1, 2 and 4) or (methods 1, 3, and 4).

If the Preconditions for Method2 are false, the Navigator will switch to Plan 2 as long as the Preconditions to Method3 are true. In the event of such a switch, certain loops may become invalid. Referring to Example 7, if there was a loop begin point at Method1 with the matching end point at Method2, and the Navigator switches to Plan 2, the begin point record for Method1 no longer has an end point. At the end of the navigation, a message is logged for each loop thus broken.

When a Navigation Error occurs, the relevant error states and exception handlers are evaluated and/or executed. These states and handlers will specify one of three actions to follow: Continue, Resynchronize, or Stop.

Continue: navigation resumes normally; the Loop State Stack is preserved and continues to govern reiteration.

Resynchronize: all records are popped off the Stack in preparation for the new plan the Planner will (hopefully) provide. A message is logged for each loop thus broken.

Stop: all records are popped off the Stack. A message is logged for each loop thus broken.

Besides branching and error handling, the other way to break or malform a loop is through unmatched begin or end points. Embodiments of the present invention follows the 'Last is Best' format, whereby only the most recent loop begin point record on the Stack will be matched for reiteration (outer loops will only reiterate when the inner ones are done), as seen in Example 8: Malformed Loops:

End Point Loop 2
End Point Loop 1
Begin Point Loop 2
Begin Point Loop 1

Begin Point Loop 2 is the inner loop here. Therefore, End Point Loop 1 will not result in reiteration to Begin Point Loop 1. Instead, it will be discarded each time and a message will be logged to the effect that there was an unmatched end point. End Point Loop 2 will match Begin Point Loop 2, however, and reiteration will proceed normally. When the navigation is complete, there will be an orphaned record on the Stack for Begin Point Loop 1. This record will finally be popped off and a message will be logged to the effect that there was an unmatched begin point.

In general, any end point record that the Navigator tries and fails to match to the most recent begin point will be discarded as an unmatched end point.

Figure 8:
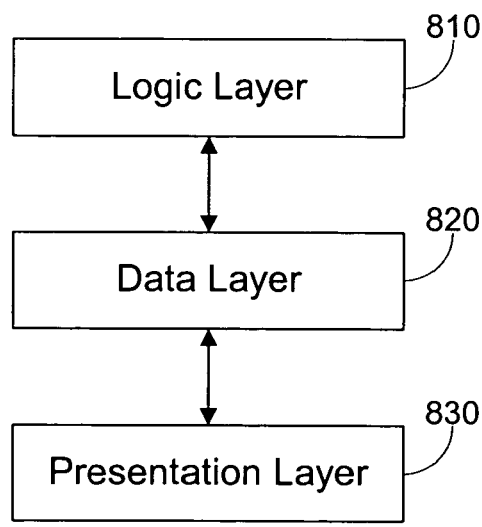
FIG. 8 is a block diagram of the three layers of a computer application.

As depicted in FIG. 8, a computer application can be divided into three layers: logic layer 810, data layer 820 and presentation layer 830, and the present invention brings to managing information access at all application layers, as described below. Not only are these layers used to architect and manage applications, they also enable applications to communicate with users and other applications. Each layer has its own purpose and corresponding strengths and weaknesses in relation to accessing enterprise information. It is therefore very important to understand each layer and how it can be used to publish, update and retrieve information.

The logic layer contains all of the code that drives the application. The data layer simplifies and optimizes access to the data used within the application. The presentation layer is the visible part of the application with which the user interacts.

As described above, the logic layer of an application contains the code that drives the application. All of the main functions of the program are built into this layer, typically with a programming language. The languages available vary greatly, from legacy systems using COBOL to object oriented systems written in C++ or modern systems built in Java. A user never sees the logic layer, however. User interaction with the presentation layer activates transactions in the business logic layer that in turn perform data manipulation functions at the data layer. Integration at this level can be very reliable and scalable. In cases where there are high volume requirements and the transaction layer is well defined and well documented, this is the preferred technique. But not all applications are written to expose transactions for integration. Systems that expose transactions still typically expose only a small subset for access from other systems. The expense and time required to access information that is not part of this subset can skyrocket. Now you are required not only to build the solution to move the data between systems, but to write code in the logic layer of the application to expose the information—a complex programming task even in simple programming languages.

While the logic layer is often the preferred method of integration, there are some significant problems that limit the usefulness of this technique. As mentioned, the first problem is the lack of available interfaces. Building a transactional interface is invasive, time consuming and complex, typically requiring code development or installation of software or adaptors on the target systems. This approach is orders of magnitude more complex than the other integration options. It may not even be feasible when accessing a system outside of direct control. Third parties, especially customers and application service providers, will not modify their systems or allow installation of outside software. Exposure of transactions can also introduce security problems. Transactions are often written for internal systems and do not have the security mechanisms to share information outside of the enterprise. When not used properly, some transactions may create instability. Maintenance with transaction level access generally requires a steep learning curve and ongoing expertise.

Returning now to FIG. 8, Traditional enterprise application integration (EAI) is based on a three-tier architecture comprising process definition, code and adapters. If a pre-defined adapter does not exist or if an existing adapter does not meet the requirements of the application, extensive programming is required to link a system to another application. EAI focuses on transaction level attachments between systems. This often necessitates considerable programming, since its construction is contingent on detailed background knowledge and experience in the target systems. Additionally, EAI systems are based only on defined processes, and determination of the full extent of processes necessary to complete an integration project is time-consuming, often requiring intense user interviews and in-depth system architecture reviews. Finally, maintenance of complex EAI systems is time-consuming. The ramifications of slight changes to underlying objects and methods used within the processes are often extensive, with equally extensive process re-engineering.

Traditional integration is useful for systems that can justify the development work required to build tightly coupled connections between all systems: applications that have high transaction counts and utilize relatively static transactions. Many business services, however, have significant volume requirements and are dynamic. The dynamic nature of many systems requires frequent changes to static processes, making the maintenance of an EAI solution too expensive.

Further, traditional integration would not be possible without the large number of adapters included within the integration toolkits. While there are adapters available for many types of applications, these adapters only interface with off-the-shelf systems. Customization to an application therefore requires customization to an adapter. And while many integration tool sets provide some form of adapter extension, adapter construction requires broad system knowledge and development expertise and is therefore expensive.

These and other aspects of the Logic Layer are summarized in Table 1:

TABLE 1

Logic Layer
Information/Transaction Bus
Coded integration using APIs, adapters, or message queues

| | |
|---|---|
| Best Fit | High transaction volume (>100/sec) |
| | Static transactions |
| | Packaged/COTS applications |
| | Well documented, robust interfaces are present |
| Pros | Performance |
| | Guaranteed delivery |
| Cons | Expensive |
| | Long, slow development and deployment cycle |
| | Invasive |
| | Static process definitions |
| | High maintenance costs |
| | Typically requires installing software on the system |
| | Security/instability risk |
| | Require adaptors |

Returning to FIG. 1, the data layer of an application consists of the range of data sources (e.g. flat files, databases, directories) and the methods required to access them. While many systems use relational databases, there are various other forms of data storage commonly used, including older hierarchical databases, btree systems, and flat files. Direct access bypasses other layers of the system, enabling direct manipulation of the data required for any transaction. For this reason, access at the data layer of an application can result in an extremely efficient integrating process in certain scenarios. However, direct data integration can be exceedingly complex and error prone and is the preferred method only for very simple integration tasks.

To obtain data from an application at the data layer, a developer must clearly understand the meaning of the data and the methods for extraction. Information at this layer is very fragile, particularly in databases. Therefore, layers of security and business logic often insulate people and systems from the data. Although it is theoretically possible to write directly to a database for integration purposes, security and data integrity dictate that this is rarely the best method for integration.

Some applications are constructed in anticipation that data access will be the integration method for external systems. For pre-determined input and output transactions, this is a useful strategy and will usually require little programming effort. But, for transactions outside the pre-determined integrating set, data level integration requires immense expertise and development. For example, complex table and query structures can be difficult to develop and have incredibly adverse performance impact.

In addition, certain information in the data layer is not directly useful without invoking another layer as part of the service. Consider changing a customer's address. While it is possible to update the customer's address field at the data layer, this update will not automatically check to see if the customer in still within the service area, check if there is a change in the billing rate or send the customer a change of address confirmation. These activities require work within another layer of the application.

Continuing with FIG. 8, an enterprise information integration (EII) is a popular tool to address integration through database access. EII tools combine the registries of various database systems into a federated database schema that can be used to automatically drive access to many systems. EII environments generally use SQL as the high-level query language and are able to coordinate calls to multiple systems. In some EII environments, transactions can be mapped to tables, allowing some level of transaction based integration.

While EII is effective for query-based architectures, it essentially provides only a single view of multiple databases. The architecture is data centric rather than method or service centric. It therefore often lacks the tools and techniques to coordinate, manage and maintain the relationship between the underlying data sources and actual business events.

These and other aspects of the Data Layer are summarized in Table 2:

| Open Object and Data Access Coded integration using relational databases or standard interfaces | |
|---|---|
| Best Fit | Contemporary systems<br>Open standard interfaces (J2EE, application servers)<br>Relational databases (xBDC, SQL, COM) |
| Pros | Simple for supported systems<br>Lower development cost |
| Cons | Only supports subset of systems<br>Often misses business logic embedded in application<br>Invasive<br>Static code<br>High maintenance costs |

Continuing with FIG. 8, the presentation layer is that part of the application that is visible to a user. In some business contexts, only the presentation layer is exposed or accessible. Modem systems deploy the presentation layer using graphical interfaces and Web pages. Many legacy applications, typically on mainframes and AS/400s, use a terminal based presentation layer (sometimes referred to as a "green screen"—from the old desktop terminals that predated personal computers).

The presentation layer is frequently a rich environment for viewing information. The information delivered is usually the final "product," with proper formatting of computations (rounding, sums, etc.) or applied logic. For these reasons, the presentation layer seems a natural place for connection.

Presentation layer integration (PLI) works by replicating the steps that a person would use to drive an application. Consider the process of accessing a customer record from another application:

The transaction method would make a programmatic interface call. This is typically invoked via programmed code, in a language such as Java, C++, etc.

The data access method would send a database query in SQL or in another data access method. The query would execute on the database and return a data set to the sending program.

The presentation layer method would drive the application in a step-by-step fashion in the same way that a user would get to the data. Once the screen or window containing the desired information was visible to the user, a presentation layer method would read the information from the screen.

A useful feature of the presentation layer approach is the ease by which developers or systems professionals can understand the interface. For simple problems, only basic script or macro is required to extract or write data to a system. However, in complex systems or scenarios requiring multiple pieces of information across multiple screens or systems, the management of instructions to navigate the system can become much more complex.

The other challenge with the presentation layer is that it was not intended to be a transactional interface. Transactions and database layers are typically developed to optimize returning information, often in single asynchronous transactions. Since the presentation layer was designed for viewing by end users, information may be spread across multiple screens, requiring more work to complete a transaction. Accordingly, the presentation layer is not ideal for extremely large transaction volumes. Brokerage firms are a good example with large volume systems—hundreds of trades a second are processed.

Outside of large transaction volume applications, presentation layer access can be a particularly effective method to extract or write information. Access at the presentation layer is most appropriate where:

1. Access to the data layer or transaction layer is not possible. Access may be unavailable for security or system ownership considerations. Inaccessibility occurs with systems outside of direct control—systems hosted at application service providers (ASPs), in the supply chain or in other business units.
2. The data layer or transaction does not exist. If the layer does not exist or does not publish the required transaction, an expensive rewrite of the application is required to create the transaction.
3. Final business logic is not applied to accessible information. In this case, for example, different customers may be treated differently due to regional product differences or local laws. All of the knowledge required to change information, say interest rates, may be embedded in the code of the program, and only accessible to the presentation layer.

Although there are many advantages to using the presentation technique, the presentation layer can be difficult to work with and extremely unreliable without the right tool set. The complex macros required to handle complex scenarios have prevented many companies from taking advantage of the power of PLI. One change to the formatting of a screen could require significant rewrites to scripts. If the system is running slow due to an increased workload, the scripts may run too fast, may not be correctly processed, and therefore may not return information.

It is important to note that these problems are not unique to the presentation layer—both the transaction and data layers are also sensitive to application architecture and system performance issues.

Continuing with FIG. 8, the present invention further includes Presentation Layer Tools. To drive an application as a user, a system must be able to perform some important functions: recognize screens and screen states as they appear, send keystrokes in order for the application to function, read information from the screen, transform information into a form required for input into other screens and make decisions about sequences of actions based on some usage objective. A comprehensive toolkit is necessary to fully enable a developer to easily implement an efficient, scalable application. PLI projects based on a limited tool set may sometimes achieve quick wins, but will rarely scale beyond the initial target project. The reason is complexity—without a full tool suite, PLI is difficult.

PLI can be accomplished using a variety of techniques. One method uses a terminal macro concept. Many terminal emulators have macro systems that allow developers to write scripted steps within the emulator. These steps can be played back through a transactional interface. Done this way, PLI is referred to as "screen scraping," since information is scraped directly from an interface screen. There are some very good tools available to simplify construction of screen scraping applications. These tools allow direct capture of screens, simplified mapping to and from screen structures and some level of debug.

While effective for certain applications, there are some drawbacks. Terminal macro languages are quite limited, lacking the full maturity of a commercial programming language and development environment. Often, important tools are missing, for example, pattern matching and screen identification methods, complex read and write commands, offline simulation methods, etc.

A tool directed at the screen scraping problem alone is also of limited usefulness if it does not contain the full suite of facilities for handling goal directed services. On-the-fly decision making is a critical component, unavailable in most tools but a requirement for environments that emulate the behavior of people. Decision making is not just conditional branching. Full decision making requires a method whereby user sequences can be planned at run-time to correctly navigate an application. Decisions must be made about the action sequences that are necessary and unnecessary. Without a full toolset, the incorporation of dynamic decision making is difficult.

Language based API toolkits provide another technique to deal with PLI. However, language toolkits lack a full tool suite, are complex and require experienced programmers with in-depth knowledge of screen scraping and navigation techniques. API based tools also have a limited shelf life, since slight modifications to an application may require extensive API recoding.

These and other aspects of the presentation Layer are summarized in Table 3:

| Application Wrapping Non-invasive integration through user interface | |
|---|---|
| Best Fit | Systems that can't reasonably be changed (host/legacy) |
| | Systems outside control |
| | Divisional/federated systems |
| | Regulated systems |
| | Supply chain/customers |
| | External Web sites |
| | Time critical deployments |
| Pros | Non-invasive |
| | Minimal implementation costs |
| | Rapid implementation |
| | Complex systems - especially legacy |

-continued

| Application Wrapping Non-invasive integration through user interface | |
|---|---|
| Cons | Mid-tier performance |
| | Ability to adapt critical to success |
| | Static code |
| | High maintenance costs |

Accordingly, the present invention provides a novel approach for addressing these problems. "Automated service assembly" is the architecture pioneered in the present invention to address the information access challenge. Automated service assembly enables the demand time creation of information access services at any layer of the integration stack. Since services are assembled on demand, the present invention easily adapts to changes in the enterprise and underlying systems, resulting in faster deployment and lower maintenance costs than is characteristic of traditional options.

The technique employed in the present invention is based on planning, which, along with the related field of scheduling, has evolved since in it was pioneered in 1970 into a heavily utilized technology in academics, government and the private sector. Planning methods now form the underlying architecture for many significant systems: ERP, supply chain management, workforce planning and others. The present invention has particular application to the use of technology to enterprise information access and the construction of an advanced goal based platform that is unequalled in power and flexibility.

The power of planning and scheduling is found in the techniques that are used to encapsulate the possible events into a model, and the ability to use a planning engine, to automatically assemble those models to achieve a business goal. Conventional environments require that all procedures be pre-constructed, typically in code, and maintained by hand to manage all service contingencies. Instead, present invention uses the rules governing the conditions and goals of any business operation performed by computer systems to schedule sequences into fully automated operational plans.

To help understand how the present invention works, lets compare it to one of the most common consumer examples of planning—navigation systems, like. Think of the challenge of coding all of the possible results of point A to point B navigations. Just coding all of the possible routes between two points could take man-years of effort? This is the equivalent of writing static code to handle all of your information access? The reason the navigation systems can be successful, is the fact that each road is modeled and broken down into its most discrete components. The navigation system can then assemble the models in the most optimal order, providing the most efficient route. The present invention utilizes the same approach, however it plans information access. When a business goal is presented to the present invention, it dynamically assembles the models to read, update or publish information to achieve the goal.

The present invention treats every possible object within a business as a business object. Each business object can have its own hierarchical database, representing the data required to manage the object or data that models what the object does. Each business object can be given a set of states: variables that represent the status of the object within the business. Each business object is also defined with a set of business methods that are similar to procedures found in a standard programming language. Some of these methods are information access methods, since they read and write information to databases, transaction systems and presentation layer interfaces. The planner always explicitly determines procedural implications of changes to a model, so specification of complex interactions between operations is straightforward. This makes working with The present invention simple.

Here is how the present invention works. First, the present invention uses planning algorithms to navigate from a starting point (expressed as a business object state) to a goal (expressed as a list of business object states). The present invention considers many possible paths and considers decision-making points with path alternatives. The present invention provides a list of executable business methods and decision procedures that allow a goal to be achieved. The resulting plan or procedure can be immediately used by applications that use the present invention to communicate with multiple systems.

Conventional automation tools allow a small number of pre-specified procedures to run at demand time, but do not have any knowledge of the goals upon which the procedures are based. The present invention allows the service goals to assist with construction and maintenance of a service method. Services are assembled at design or run-time as required. This innovation enables rapid assembly of any service and simplifies service maintenance.

Another key component within the present invention is the recorder. While other service editing environments record macros or scripts, The present invention does far more—a recorder observes a user on a system and automatically determines the business events and business objects that must be used to achieve the goals of a given navigation. Once recorded, a highly flexible and adaptable model is constructed for use in planning navigation sequences.

Finally, the present invention contains a full suite of tools, including a screen capture facility, trace recording, automatic navigational instruction, pattern matching, automated screen identification, session recording and simulation. It integrates with many other forms of information, including databases and transaction systems. The present invention employs a mature programming language for solving complex problems and uses a high level modeling technique for on-the-fly decision making: required for effective service automation systems, and particularly critical for the presentation layer.

Implementation of business services requires access to all three layers of an application, and The present invention enables the appropriate access method for any business context. The present invention connections can be made to almost any system, generally without programming. With the present invention, a fully automated goal directed service is simple, inexpensive to build and easy to maintain.

These and other aspects of the integrated Three Application Layers are summarized in Table 4:

| Integrated Application Layers | |
|---|---|
| Best Fit | Systems that can't reasonably be changed (host/legacy) |
| | Systems outside control |
| | Divisional/federated systems |
| | Regulated systems |
| | Supply chain/customers |
| | External Web sites |
| | Time critical deployments |
| Benefits | Non-invasive |
| | Minimal implementation costs |
| | Rapid implementation |
| | Minimal maintenance costs |
| | Integrates with logic, data and presentation layers |
| | Simplifies complex systems - especially legacy |
| | Ability to adapt as your business evolves |

Linking applications together to access information and provide automated business services is a crucial task facing many business managers today. While millions of dollars have been spent on huge integration initiatives, there are still many services that need to be automated but cannot be justified by the high costs of traditional tools and techniques. The present invention provides a low-cost alternative, with relatively short implementation times and rapid access to full automation.

Thus, fully automated services require information access at all levels of the application stack: data, logic and presentation. The present invention allows access to all three layers with a reliable, scalable and simple to maintain solution for full automation.

APPLICATIONS OF THE PRESENT INVENTION

As suggested above, a workflow is a computational model of a business process. It is a collection of interconnected activities. A work-flow management system (WFMS) provides tools to de-fine, manage and execute workflows. Workflows are either specified as flow-graphs, which define control dependencies among tasks as a directed graph, or as structured programs. The emergence of web service technologies provides a new way for applications to communicate with each other. Many standards are proposed on how to specify the coordination of web service communication and execution as workflows. As described above, the present invention enables flow specification language supports both structured constructs and flow-graph constructs. It also supports the concept of an abstract process, which serves as an interface definition that hides implementation details. The concept of an abstract process is important because it can be used to describe the protocol used by the process, P, to communicate with other web services. Hence it can be used to construct other web services which communicate with P without revealing P's internal organization.

The model of the present invention is based on program logic to formally specify workflow semantics. It provides inference rules describing control constructs and can be used to reason about the correctness of an abstract process. Program logic does not support fully automatic reasoning since the choice of loop invariants requires human intervention. However, because of the restrictions on data assignment generally recommended for an abstract process, an automatic verification algorithm can be constructed in our model.

The present invention further provides an algorithm that automatically synthesizes a workflow given its specification and a library of available tasks with well-defined semantics. It is assumed that the tasks satisfy the ranking assumption. This means that each task performs something "good" and leads closer to a business goal. Ranking holds in processes we have studied from the financial services industry: trade negotiation processes and corporate actions. These processes share common properties making automatic synthesis particularly appropriate. However, their details are different, and can be quite complex. In addition, many of them have to change frequently due to changes in business rules. Constructing workflows from these tasks manually is costly and error-prone. Automatic synthesis can provide a solution for this problem.

Accordingly, as can be seen in the following discussion, the present invention provides: 1. a logical framework in which the semantics of tasks and workflows can be formally specified; 2. a set of inference rules for reasoning about the correctness of workflows; 3. a verification algorithm which is both complete and sound; and 4. a workflow synthesis algorithm.

With reference to the process model of the present invention, computation is separated from control. A major advantage of describing business processes as workflows is to separate the details of computation from control flow. Details should be contained in task implementations, whereas workflows specify the execution order of tasks. Tasks publish only their interfaces; implementation details are hidden. This separation supports interdomain task integration and task re-implementation.

Workflows are data-dependent. Thus, a mortgage workflow evaluates a customer based on his credit, and produces a status. The workflow may subsequently branch on the status. Hence, a workflow language has to have the capability of specifying data-dependent behavior (i.e., conditional statements). However, the computation that determines status complicates the description and need not be visible to communicating web services. Furthermore, it may be proprietary to the organization.

To emphasize only the control flow aspect of a workflow, we limit the computational capabilities of the present invention's abstract process. Similar to an abstract process, a workflow specified in the present invention is generally not executable because it lacks computational power, but it defines the control logic among tasks, and can be used to describe the protocol that should be followed by all parties interacting with the workflow.

A task has a name and sets of input and output parameters. We assume that a task in a business process, P, corresponds to an operation invoked by P and implemented within and exported by a remote web service, that may be described in a Web Services Description Language (WSDL) document. WSDL is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate. We focus on the abstract (e.g., interfaces), as opposed to the concrete (e.g., bindings), aspect of WSDL to describe tasks. All tasks used in business process specification form a task library, which corresponds to one or more WSDL definitions.

A workflow specification contains an activity body, and a set of variables. The body specifies the control flow logic using Invoke, a restricted form of Assignment, Sequence, Switch, and While. The model has been extended to include Flow, but we do not discuss that here. In one implementation of the present invention, an opaque assignment defined in assigns to a variable a value that has been nondeterministically chosen from the variable's domain. The actual value assigned is not specified. The postcondition of opaque assignment can only assert that a value has been assigned. This restricts the language to describing only control flows, and serves as an abbreviation of the computation which might appear in a fully executable description of the workflow. Only the while loop is typically provided. Hence, an assignment to a loop counter variable is constructed, as described above for a loop. To eliminate the need for such an assignment statement but to provide for-loop capability, we introduce the FOR loop construct.

We describe a simple logical framework on which the semantics of tasks and workflows can be formally specified. In this model, we describe the execution state of a workflow using propositional logic. A proposition asserts a basic fact about the workflow state. A literal is either a proposition or its negation. All the literals that are relevant to describing workflows form the universe, U.

The universe comes from the workflow specification and the library. For example, a telecom company might have a task that strings a phone line to a home, making the proposition wired true, and another task that installs phone service. Then wired is an element of U, and it is a postcondition of the former task and a precondition of the latter task. Since propositions of this type are the result of task execution, we refer to them as task propositions. If x is a variable, then gen(x) is a proposition in U asserting that a value from x's domain has been assigned to x (as a result of an opaque assignment or the the execution of a task). Initially, the value of x is undefined, and gen(x) is false. We include gen(x) in the set of task propositions.

Conditions on variables are a component of the workflow state. Thus if x is an integer variable and a workflow has a SWITCH with condition $x \leq$, then $x \leq$ is part of the workflow state on one branch of the switch. A condition is also a proposition, although not a task proposition.

At any time, the state s of a workflow execution is a set of true literals in U. A proposition p is defined if either p or p is a member of s, which means p is true or false, respectively. p is undefined if neither p nor p is in s. Hence a state assigns a subset of literals in U Boolean values.

An assertion is a well-formed formula (wff) defined on U. A well-formed formula (wff) is a sentence in propositional logic, so an assertion can be evaluated to true, false, or undefined on a state based on the assignments to the literals.

An action is used to formally describe the operational semantics of a task or workflow by specifying its effect on the workflow state. An action performs an update operation on a state s. The effect of the update can be nondeterministic and conditional, therefore the result is a set of possible new states. Hence an action is a function that maps an input state to a set of possible output states.

The computing of pre- and postconditions is now described. Given the precondition, P, of an action, A, we can compute the strongest postcondition (e.g., likely result given a starting condition). Similarly, given the postcondition, Q of A, we can compute the weakest precondition (needed input to achieve a desired result).

Given an activity's precondition, the inference rules of program logic can be used to generate an annotation consisting of assertions describing the state at control points. Whereas the need to determine appropriate loop invariants makes the automatic generation of an annotation impossible for arbitrary programs, the restrictions on assignment eliminate this problem.

Given the semantics of each task and the workflow precondition, an annotation algorithm automatically annotates and verifies a workflow in two steps:

Starting from the workflow precondition, get strongest assertion at each control point by recursively determining the pre- and postconditions of all nested activities using Result and the inference rules; and Check that the annotation satisfies all task precondition.

If a precondition of an activity is not satisfied, the workflow is incorrect and the procedure returns false, otherwise, it returns true. A workflow is correct if the postcondition produced by the algorithm implies the workflow postcondition contained in its specification. A workflow, W, can then be put into the task library and invoked by other workflows in the same manner as a task.

An algorithm to synthesize a work-flow is now briefly described. The input is a task library, and a workflow specification: its pre- and postcondition. The algorithm produces a workflow that satisfies the specification. For simplicity, we assume that task preconditions and workflow pre- and postconditions are conjunctions of positive task propositions and that actions are either conjunctive or nondeterministic. Disjunctive preconditions and conditional actions can be handled by partitioning a task into multiple tasks. The model can be extended to handle conditions and some aspects of negation.

It may be assumed the that the library is ranked:

Task propositions are associated with ranks, which are positive integers;

A task proposition and its negation have the same rank.; and

A task has at least one positive task proposition in its action, called its primary output, that has higher rank than any task proposition in its precondition and any negative task proposition in its action.

The following algorithm may be used to find a possible path and assumes that tasks are all deterministic. A path is a sequence of tasks in a work-flow. We can find a path that satisfies a given postcondition using a closure algorithm that calculates a closure set of literals, CL. Each literal 1 in CL is associated with a task T1, which has as a primary output. 1 can be made true through a path terminating with T1. A function may find a path for a given literal 1 by first locating the task T1 from the closure set CL, then finding a path that implements the precondition of T1 and appends T1 at the end. In particular, a procedure may find a path Path(G) given a conjunctive postcondition G. It first sorts the literals in G from highest rank to lowest as g1 . . . gm. It then finds paths for each gi and concatenates them in index order. Ranking guarantees that the resulting workflow meets the required specifications.

It should be appreciated that the system and method of the present invention may be used to verify an existing workflow that was previously creating manually or using the methods and systems of the present invention. Thus, AI Planning as a form of automated reasoning can be used to verify that a process/workflow is correct, i.e. that the goals of the process can be achieved.

CONCLUSION

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

APPENDIX A

```
Private Sub BuildMap( )
'go to each trace
'try to build the tree
Dim i As Long
Dim anAction As String
Dim aNode As String
Dim previousNode As Integer
Dim targetNode As Integer
Dim currentNode As Integer
Dim currentAction As Integer
Dim previousAction As Integer
```

APPENDIX A-continued

```
Dim newInArc As Integer
Dim newOutArc As Integer
Dim previousArc As Integer
Dim resLen As Long
Dim s As String
Dim eol As Boolean
Dim j As Integer
Dim countLines As Integer
i = 1
countLines = TraceList.ListItems.Count
For j = 1 To countLines
    s = TraceList.ListItems.Item(j)
    i = 1
    resLen = Len(s)
    eol = False
    previousNode = 0
    targetNode = 0
    currentNode = 0
    currentAction = 0
    previousAction = 0
    i = getNextToken(s, i, aNode)
    currentNode = findNode(aNode)
While Not eol
    i = getNextToken(s, i, anAction)
    If anAction = Chr(13) Or anAction = "" Then
        eol = True
    Else
        currentAction = findAction(currentNode, anAction)
        i = getNextToken(s, i, aNode)
        If aNode =Chr(13) Or aNode = "" Then
            eol = True
        Else
            targetNode = findNode(aNode)
            newOutArc = addOutArc(currentNode, targetNode, currentAction)
            newInArc = addInArc(currentNode, targetNode, currentAction)
            If previousNode > 0 Then
                joinArcs currentNode, previousArc, newOutArc
            End If
        End If
    End If
    previousNode = currentNode
    currentNode = targetNode
    previousAction = currentAction
    previousArc = newInArc
Wend
'i = getNextToken(s, i, aNode) 'should be chr(10)
Next j
End Sub
    For each node (which will call a target):
        addOutArc simply examines a node action node triple and assigns
        a unique number where the arc emanates from the target node.
        addInArc also examines a node action node triple and assigns a
        unique number where the arc emanates from a node connecting to
            the target node.
    Each in/out pair is given a joint arc count. To determine states:
    For each unique arc in
        Compare to every other arc in
            Compare their joint arc counts.
        If one is zero and the other is not, then they do not share output state
    Here is the arc counting code:
Sub joinArcs(aNode As Integer, anInArc As Integer, anOutArc As Integer)
    'go to inArc and add outArc
    'go to outArc and add inArc
    If gLearnNode(aNode).inArc(anInArc).arcJoin(anOutArc) = 0 Then
        gLearnNode(aNode).inArc(anInArc).arcJoinMax = _
        gLearnNode(aNode).inArc(anInArc).arcJoinMax + 1
    End If
    If gLearnNode(aNode).outArc(anOutArc).arcJoin(anInArc) = 0 Then
        gLearnNode(aNode).outArc(anOutArc).arcJoinMax = _
        gLearnNode(aNode).outArc(anOutArc).arcJoinMax + 1
    End If
    '*****
    If gLearnNode(aNode).inArc(anInArc).arcJoin(anOutArc) < 32000
    Then
        gLearnNode(aNode).inArc(anInArc).arcJoin(anOutArc- ) = _
        gLearnNode(aNode).inArc(anInArc).arcJoin(anOutArc) + 1
        gLearnNode(aNode).outArc(anOutArc).arcJoin(anInArc) = _
        gLearnNode(aNode).outArc(anOutArc).arcJoin(anInArc) + 1
    End If
```

APPENDIX A-continued

```
End Sub
Here is a code that finds states:
Sub findStates(aNodeID As Integer)
'for each input node
'check the output count
'if the output <> nodeOutputTotal then
'assign input and all outputs to a particular state
Dim i As Integer
Dim j As Integer
Dim inArcAction1 As String
Dim inArcNode1 As Integer
Dim inArcAction2 As String
Dim inArcNode2 As Integer
'is the inArc joinMax < anode outarcmax
   With gLearnNode(aNodeID)
      .stateMax = 1
   .inArc(1).itsState = 1
   For i = 2 To .inArcMax
      'If .outArcMax > .inArc(i).arcJoinMax Then
      'for that input arc and all joined arcs
      'assign a state determined by the
      'output set
      done = False
      inArcAction1 = .inArc(i).itsAction
      inArcNode1 = .inArc(i).itsNode
      For j = 1 To (i - 1)
         inArcAction2 = .inArc(j).itsAction
         inArcNode2 = .inArc(j).itsNode
         If .inArc(i).arcJoinMax = .inArc(j).arcJoinMax Then
            same = True
            For k = 1 To .actionMax 'must look at all nodes
            If (.inArc(i).arcJoin(k) > 0 And .inArc(j).arcJoin(k) = 0) .sub._
               Or (.inArc(i).arcJoin(k) = 0 And .inArc(j).arcJoin(k) > 0) Then
               same = False
               Exit For
            End If
         Next k
         If same Then
            .inArc(i).itsState = .inArc(j).itsState
               done = True
               Exit For
            End If
         End If
      Next j
      If Not done Then
         .stateMax = .stateMax + 1
         .inArc(i).itsState = .stateMax
      End If
      'Else
      'for that input arc and all joined arcs
      'assign a state of 1
      '.inArc(i).itsState = 1
      'End If
   Next i
End With
```

What is claimed is:

1. A navigation planner computer system comprising:
a processor;
a computer memory coupled to said processor;
one or more computer application models stored in said computer memory, each of said computer application models describing how a remote computer application is controlled by a user and comprising a state comprising an action and one or more Boolean expressions;
a user interface not part of one or more computer applications represented by the one or more computer application models, the interface for receiving a problem statement from a user, the problem statement comprising an initial condition and an end condition, said problem statement to be solved using the remote computer application and a workflow generated by the navigation planner computer system using the one or more computer application models; and
a navigation planner stored in said computer memory; wherein when said navigation planner receives the problem statement comprising the initial condition and an end condition, each of said conditions comprising one or more Boolean expressions, said navigation planner accesses said computer application models to create the workflow for solving said problem statement, said workflow comprising an ordered combination of said one or more computer application models such that said ordered combination of computer application models contains Boolean expressions that combine to satisfy said initial condition Boolean expression and end condition Boolean expression.

2. The navigation planner computer system of claim 1 wherein said state defines a loop that represents a series of repeated steps according to a Boolean expression associated with said state.

3. The navigation planner computer system of claim 1 wherein said state defines a pattern-type used in screen navigation wherein a start of an associated action is determined at run time by evaluating an on-screen pattern.

4. The navigation planner computer system of claim 1 wherein said state represents plural services which are connected.

5. The navigation planner computer system of claim 4 wherein a first action associated with said state invokes a second action that shares a knowledge base, such that knowledge accessed by said second action is not accessed by said first action.

6. A computer-implemented navigation planning method comprising:
receiving a problem statement from a user interface, said problem statement comprising an initial condition and an end condition, each of said conditions comprising one or more Boolean expressions, said problem statement to be solved using a remote computer application and a workflow, the interface for receiving the problem statement not part of the remote computer application;
defining one or more computer application models stored in computer memory, each of said computer application models describing how a remote computer application is controlled by a user and comprising a state comprising an action and one or more Boolean expressions; and
creating the workflow for solving said problem statement, said workflow comprising an ordered combination of said computer application models such that said ordered combination of computer application models contain Boolean expressions that combine to satisfy said initial condition Boolean expression and said end condition Boolean expression.

7. The navigation planning method of claim 6 wherein said state defines a loop that represents a series of repeated steps according to a Boolean expression associated with said loop state.

8. The navigation planning method of claim 6 wherein said state defines a pattern-type used in screen navigation wherein a start of an associated action is determined at run time by evaluating an on-screen pattern.

9. The navigation planning method of claim 6 wherein said state represents plural actions which are connected.

10. The navigation planning method of claim 9 wherein a first action associated with said state invokes a second action that shares a knowledge base, such that knowledge accessed by said second action is not accessed by said first action.

11. The navigation planning method of claim 6, where said ordered combination of computer application models comprises a first model and a second model, wherein a first model state Boolean expression after a first model action is compatible with a second model state Boolean expression before execution of a second model action.

12. The navigation planning method of claim 6, where creating a workflow further comprises creating a first workflow that comprises a first ordered combination of said computer application models, and wherein the navigation planning method further comprises:

creating a second workflow for solving said problem statement, said second workflow comprising a second ordered combination of said computer application models such that said second ordered combination of computer application models contain Boolean expressions that combine to satisfy said initial condition Boolean expression and said end condition Boolean expression, and comparing said first and said second workflows and selecting between said first and second workflows based upon a pre-specified condition.

13. The navigation planning method of claim 12 wherein said pre-specified condition is counting numbers of actions in each of said first and said second ordered combinations and selecting the ordered combination having the lower number of counted actions.

14. The navigation planning method of claim 12 further comprising the steps of implementing said first workflow;
monitoring the progress of said first workflow; and
implementing said second workflow if said first workflow fails.

15. A computer program product comprising a computer program embodied in a computer readable memory medium; the computer program for performing navigation planning when executed, the computer program comprising:

a first code segment that receives a problem statement from a user interface, said problem statement comprising an initial condition and an end condition, each of said conditions comprising one or more Boolean expressions, said problem statement to be solved using a remote computer application and a workflow, the user interface for receiving the problem statement not part of the remote computer application;

a second code segment that accepts a user input to define one or more computer application models stored in computer memory, each of said computer application models describing how a remote computer application is controlled by a user and comprising a state comprising an action and one or more Boolean expressions; and a third code segment that creates the workflow for solving said problem statement, said workflow comprising an ordered combination of said computer application models such that said ordered combination of computer application models contains Boolean expressions that combine to satisfy said initial condition Boolean expression and said end condition Boolean expression.

16. The computer program product of claim 15, wherein said state defines a loop that represents a series of repeated steps according to a Boolean expression associated with said loop.

17. The computer program product of claim 15, wherein said state comprises plural actions which are connected.

18. The computer program product of claim 17, wherein a first action associated with said state invokes a second action that shares a knowledge base, such that knowledge accessed by said second action is not accessed by said first action.

19. The computer program product of claim 15, wherein said ordered combination of models comprises a first model and a second model, where a first model state Boolean expression after a first model action is compatible with a second model state Boolean expression before execution of a second model action.

20. The computer program product of claim 15, where the third computer code segment creates a first workflow that comprises a first ordered combination of said models, and wherein the computer program further comprises:

a fourth code segment for creating a second workflow for solving said problem statement, said second workflow comprising a second ordered combination of said computer application models such that said second ordered combination of computer application models contain Boolean expressions that combine to satisfy said initial condition Boolean expression and said end condition Boolean expression, a fifth code segment for implementing said first workflow;
a sixth code segment for monitoring the progress of said first workflow; and
a seventh code segment for implementing said second workflow if said first workflow fails.

21. A computer program product comprising a computer program embodied in a computer readable memory medium, the computer program for verifying a work flow when executed, the program comprising:

a first code segment that receives a problem statement from a user interface, said problem statement comprising an initial condition and an end condition, each of said conditions comprising one or more Boolean expressions, said problem statement to be solved using a remote application and a workflow, the user interface for receiving the problem statement not part of the remote computer application;

a second code segment that accepts a user input to define one or more computer application models stored in computer memory, each of said computer application models describing how a remote computer application is controlled by a user and comprising a state comprising an action and one or more Boolean expressions;

a third computer code segment that receives the workflow for solving said problem statement, said workflow comprising an ordered combination of said computer application models; and a fourth code segment that evaluates said work flow by evaluating said ordered combination of computer application models to determine whether the Boolean expressions associated with said ordered combination of computer application models combine to satisfy said initial condition Boolean expression and said end condition Boolean expression.

22. The computer program of claim 21, where said ordered combination of computer application models comprises a first model and a second model, and wherein the fourth code segment further assesses whether a first model state Boolean expression after a first model action is compatible with a second model state Boolean expression before execution of a second model action.

* * * * *